US008882596B2

(12) United States Patent
Shimamura et al.

(10) Patent No.: US 8,882,596 B2
(45) Date of Patent: Nov. 11, 2014

(54) GAME PROGRAM AND GAME APPARATUS

(75) Inventors: Takayuki Shimamura, Kyoto (JP); Yoshikazu Yamashita, Kyoto (JP); Takuhiro Dohta, Kyoto (JP); Shinya Hiratake, Kyoto (JP); Hideya Akasaka, Kyoto (JP); Yuki Takahashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1039 days.

(21) Appl. No.: 12/498,465

(22) Filed: Jul. 7, 2009

(65) Prior Publication Data

US 2010/0009760 A1 Jan. 14, 2010

(30) Foreign Application Priority Data

Jul. 11, 2008 (JP) ................. 2008-181717

(51) Int. Cl.
*A63F 9/24* (2006.01)
*A63F 13/98* (2014.01)
*A63F 13/20* (2014.01)

(52) U.S. Cl.
CPC ........... *A63F 13/02* (2013.01); *A63F 13/06* (2013.01); *A63F 2300/1006* (2013.01); *A63F 2300/105* (2013.01); *A63F 2300/6045* (2013.01); *A63F 2300/8017* (2013.01)
USPC ............................. 463/37; 463/39

(58) Field of Classification Search
CPC .. A63F 13/06; A63F 2300/105; G06F 3/0346
USPC ................................. 463/36–39, 47
See application file for complete search history.

(56) References Cited

U.S. PATENT DOCUMENTS

| 7,636,645 | B1 * | 12/2009 | Yen et al. .................. 702/152 |
| 2008/0015031 | A1 | 1/2008 | Koizumi et al. |
| 2008/0076567 | A1 | 3/2008 | Dohta |
| 2009/0191967 | A1 | 7/2009 | Konishi et al. |

FOREIGN PATENT DOCUMENTS

| JP | 2000-308756 | 11/2000 |
| JP | 2006-255400 | 9/2006 |
| JP | 2007-296173 | 11/2007 |
| JP | 2008-067877 | 3/2008 |

OTHER PUBLICATIONS http/www.nintendo.co.jp/wii/controllers/index.html, Dec. 2, 2006, 3 pages.
English-language machine translation of JP 2000-308756.

* cited by examiner

*Primary Examiner* — David L Lewis
*Assistant Examiner* — Robert Mosser
(74) *Attorney, Agent, or Firm* — Nixon & Vanderhye, P.C.

(57) ABSTRACT

A game apparatus comprises an operation data acquiring means for acquiring operation data from a first input device including at least a first acceleration sensor and an angular velocity sensor and a second input device including at least a second acceleration sensor, and a game processing means for performing game processing on the basis of first acceleration data output from the first acceleration sensor, second acceleration data output from the second acceleration sensor, and angular velocity data from the angular velocity sensor, in the operation data.

12 Claims, 27 Drawing Sheets

FIG. 3
(A)
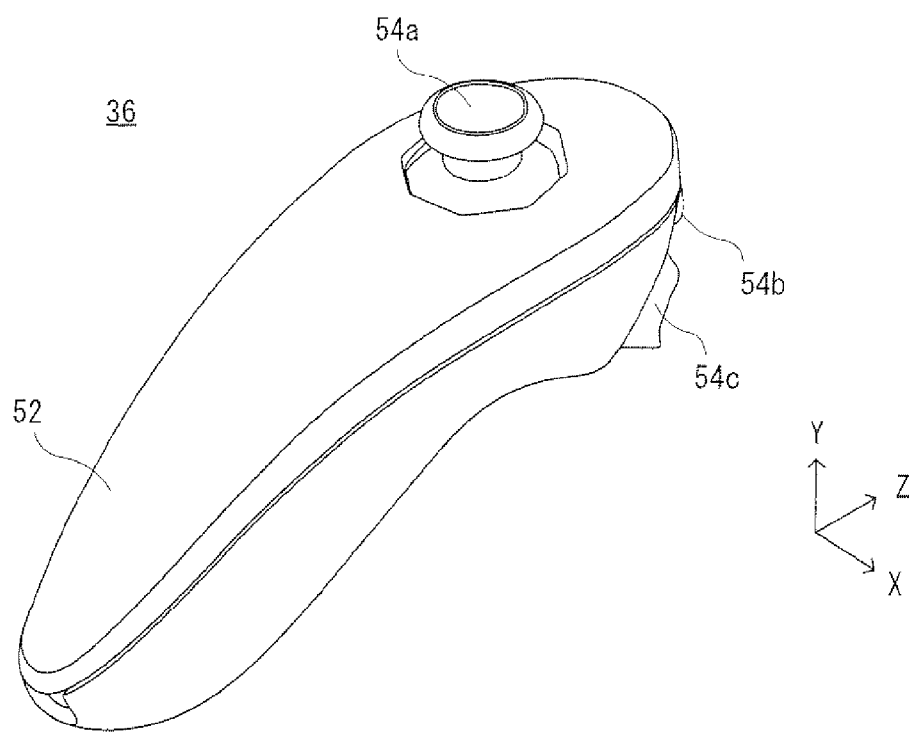
(B)
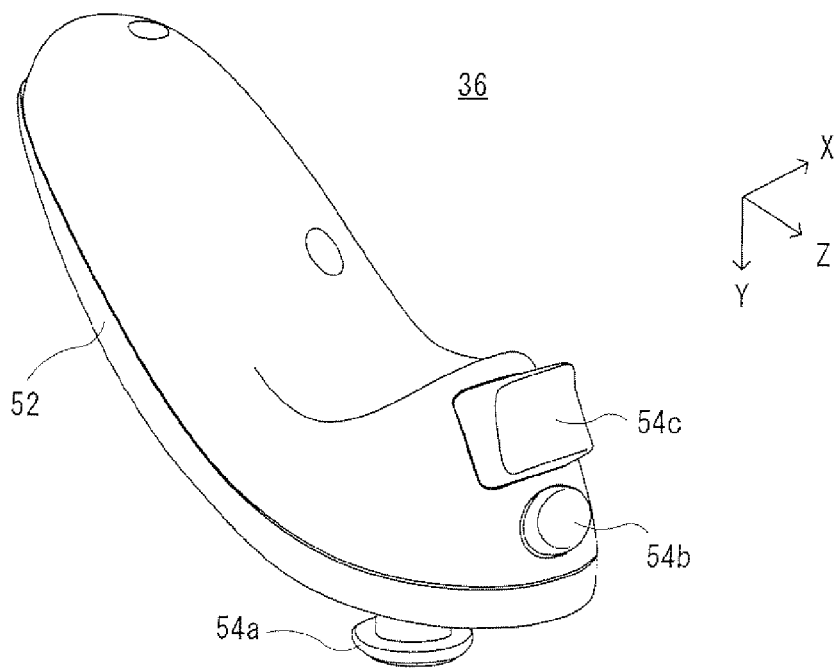

FIG. 6
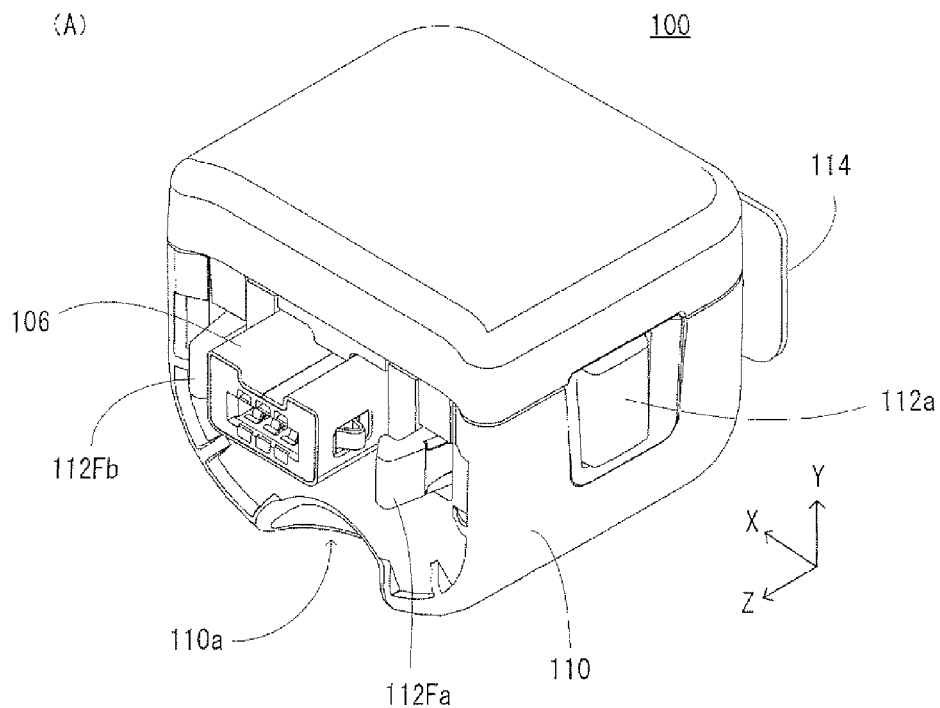
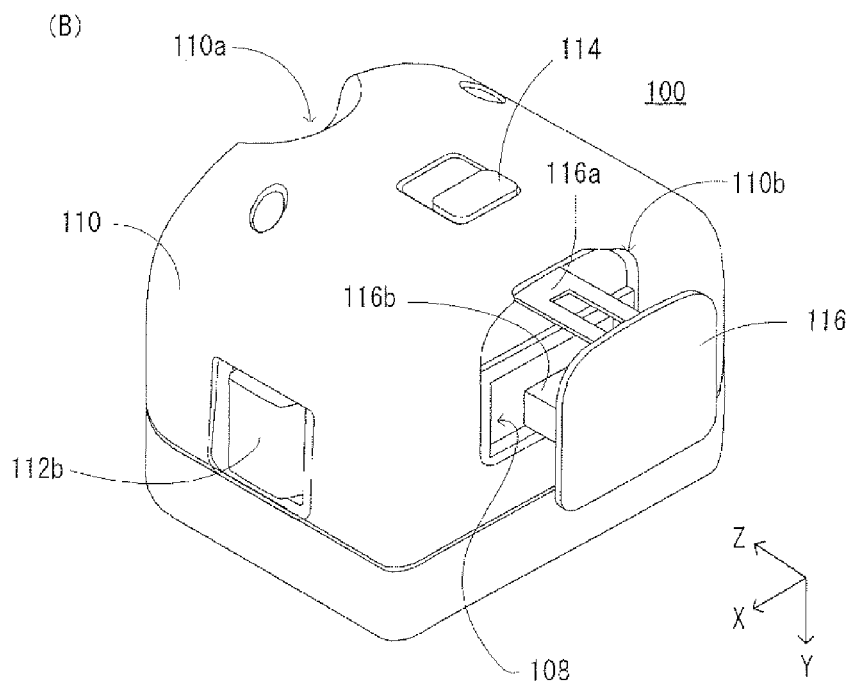

FIG. 16

(A) (DATA FORMAT FOR GYRO SENSOR)

| YAW ANGULAR VELOCITY DATA |
| --- |
| ROLL ANGULAR VELOCITY DATA |
| PITCH ANGULAR VELOCITY DATA |
| YAW ANGULAR VELOCITY MODE INFORMATION |
| ROLL ANGULAR VELOCITY MODE INFORAMTION |
| PITCH ANGULAR VELOCITY MODE INFORMATION |
| SECOND CONTROLLER CONNECTION IFNORMATION |
| GYRO/SECOND CONTROLLER IDENTIFYING INFORMATION |

(B) (DATA FORMAT FOR SECOND CONTROLLER)

| X STICK OPERATION DATA |
| --- |
| Z STICK OPERATION DATA |
| X ACCELERATION DATA |
| Y ACCELERATION DATA |
| Z ACCELERATION DATA |
| BUTTON OPERATION DATA |
| SECOND CONTROLLER CONNECTION INFORMATION |
| GYRO/SECOND CONTROLLER IDENTIFYING INFORMATION |

FIG. 19

| CONTROL TARGET \ MODE | STANDBY | BYPASS | GYRO | GYRO AND SECOND CONTROLLER |
|---|---|---|---|---|
| GYRO FUNCTION | NO ACTIVE | NO ACTIVE | ACTIVE | ACTIVE |
| GYRO POWER SOURCE | OFF | OFF | ON | ON |
| BUS SWITCH | CONNECT | CONNECT | DISCONNECT | DISCONNECT |
| EXPANSION CONNECTOR | NO ACTIVE | ACTIVE | NO ACTIVE | ACTIVE |
| Attach 1 | LOW | HIGH | HIGH | HIGH |
| I2CADDRESS | SPECIAL | SPECIAL | - | - |

FIG. 20
(A) GYRO-COMPATIBLE APPLICATION
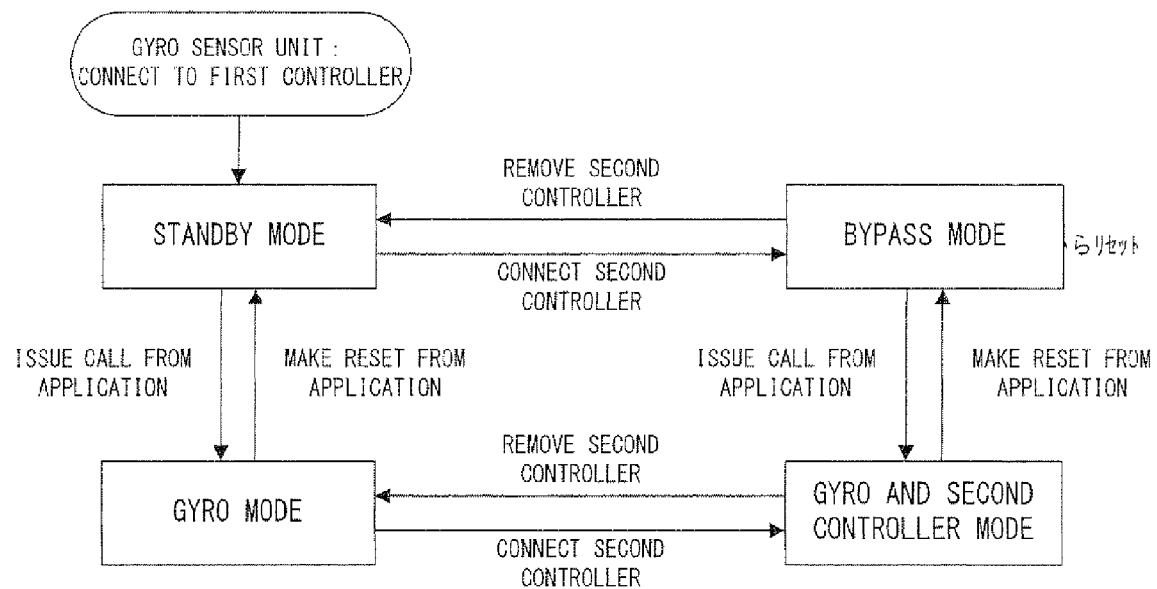
(B) GYRO-INCOMPATIBLE
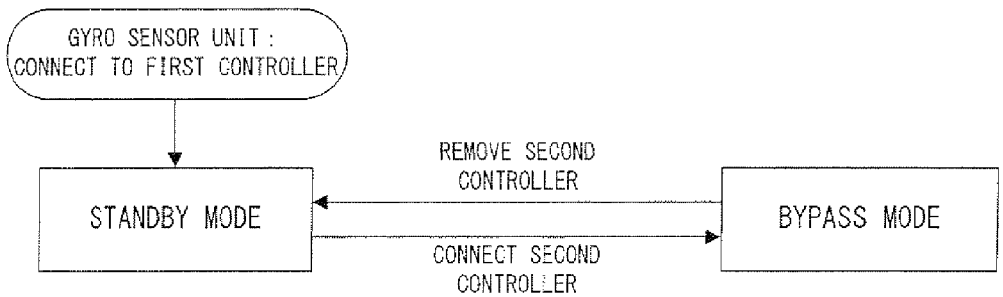

FIG. 22
(a)
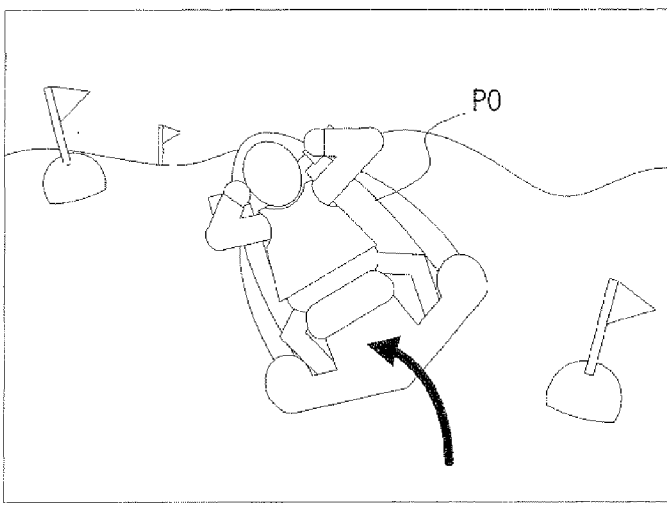
(b)
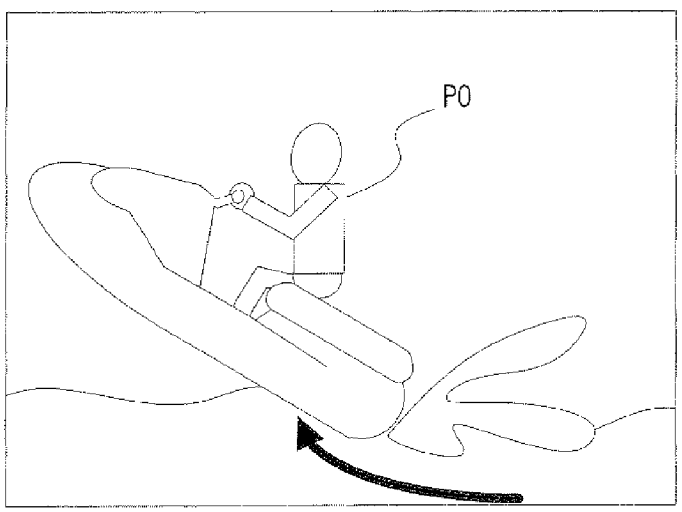
(c)
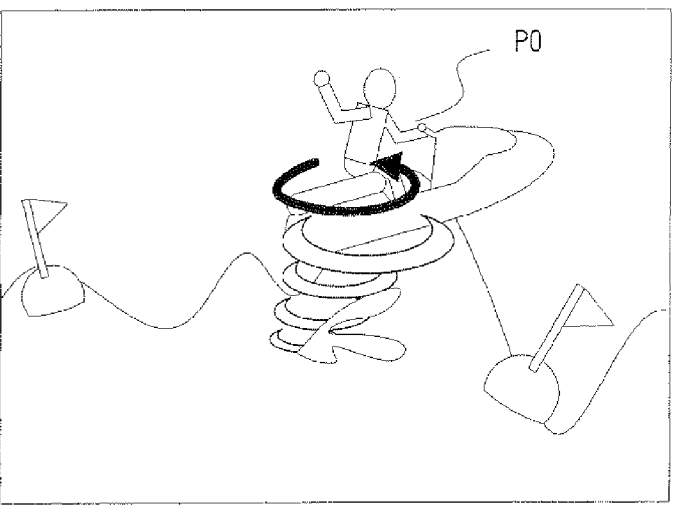

FIG. 23 (a)
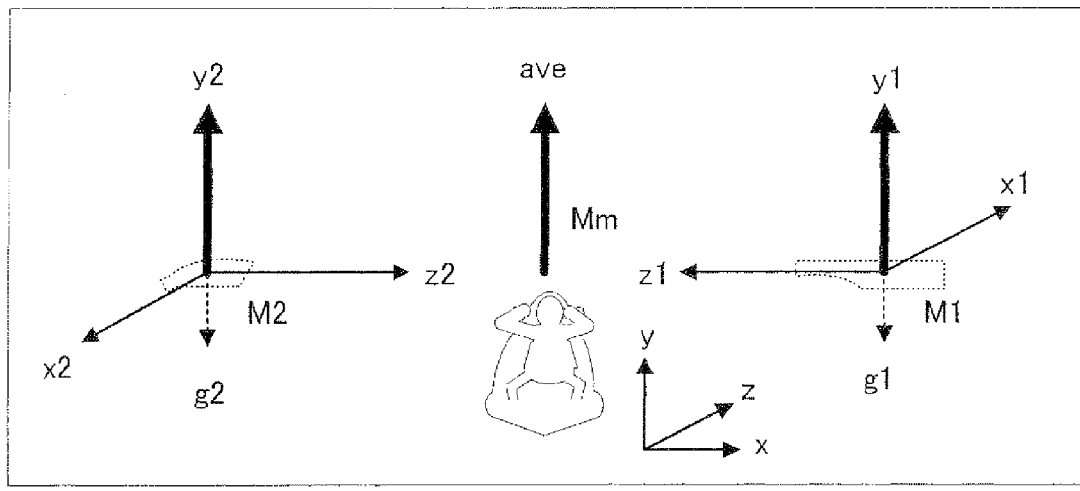
(b)
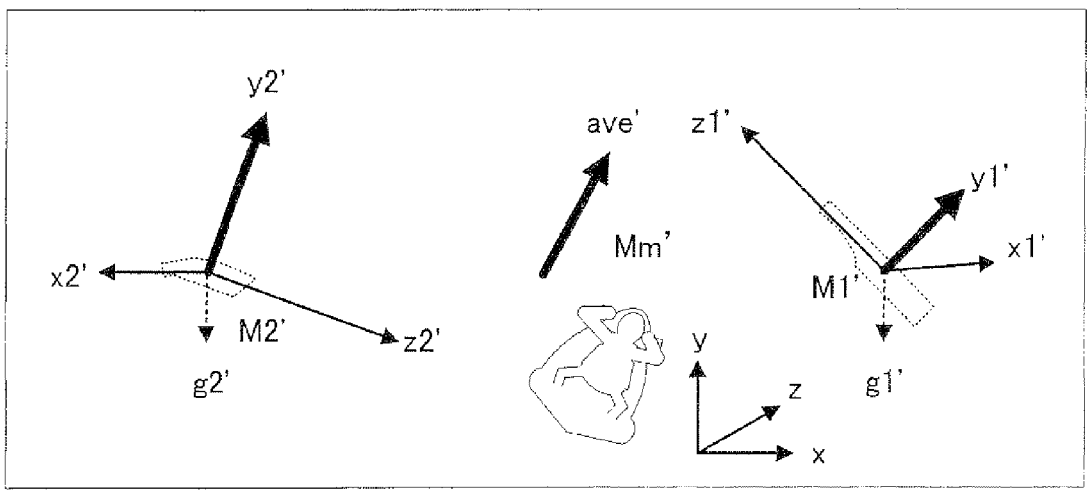
(c)
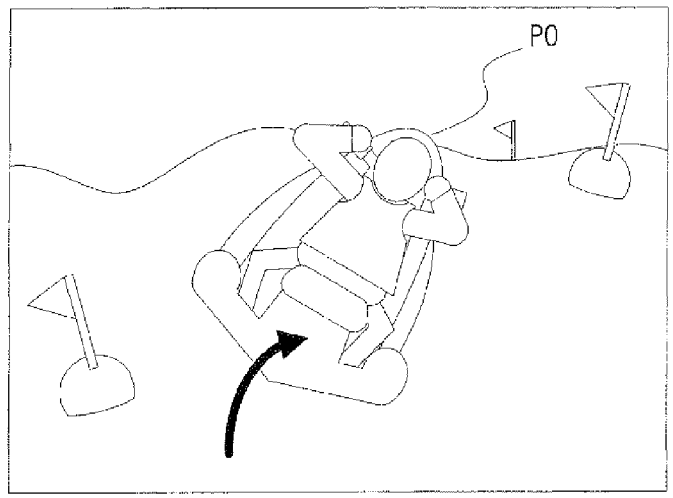

FIG. 24
(a)
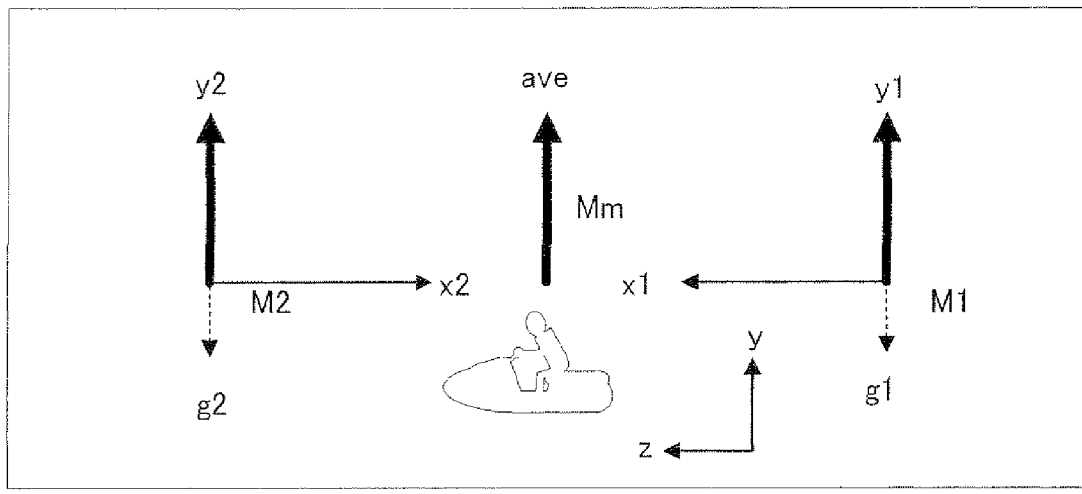
(b)
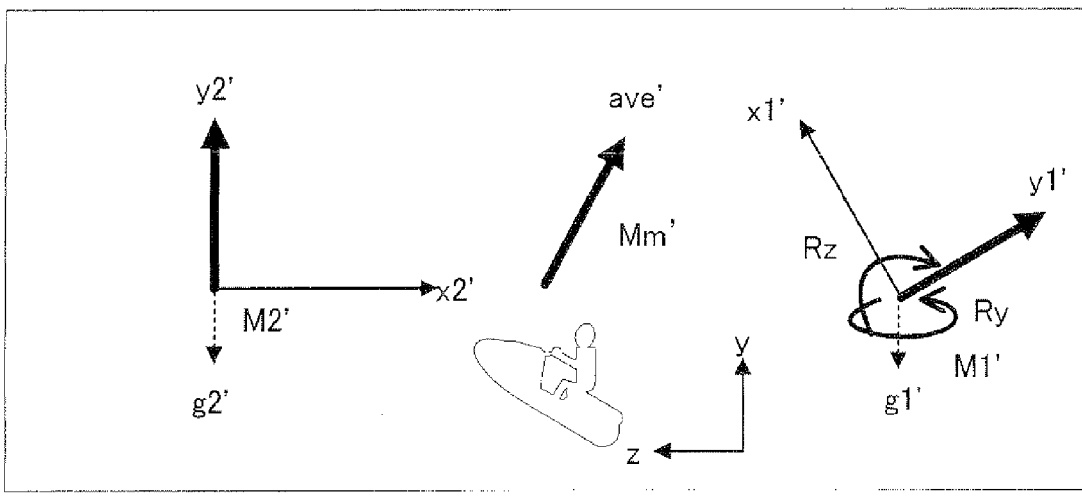
(c)
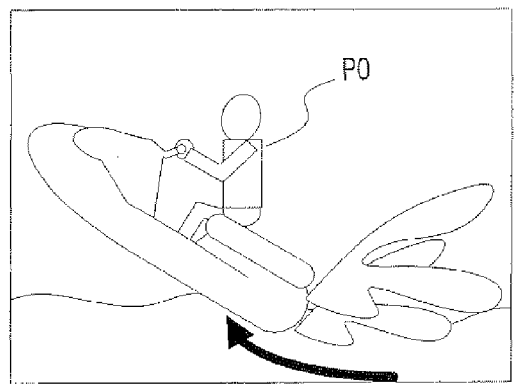
(d)
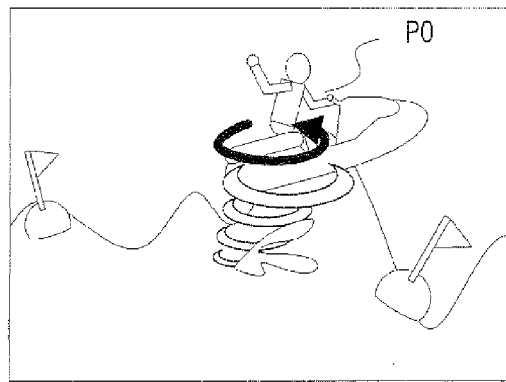

FIG. 28
(a)
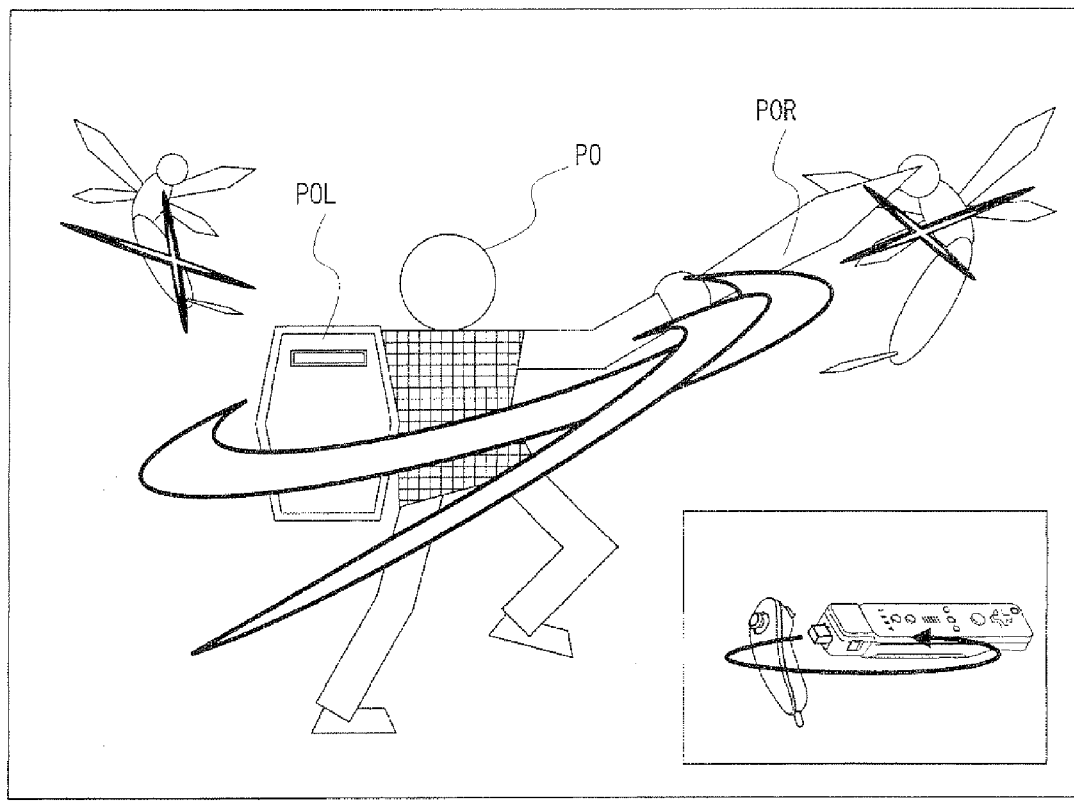
(b)
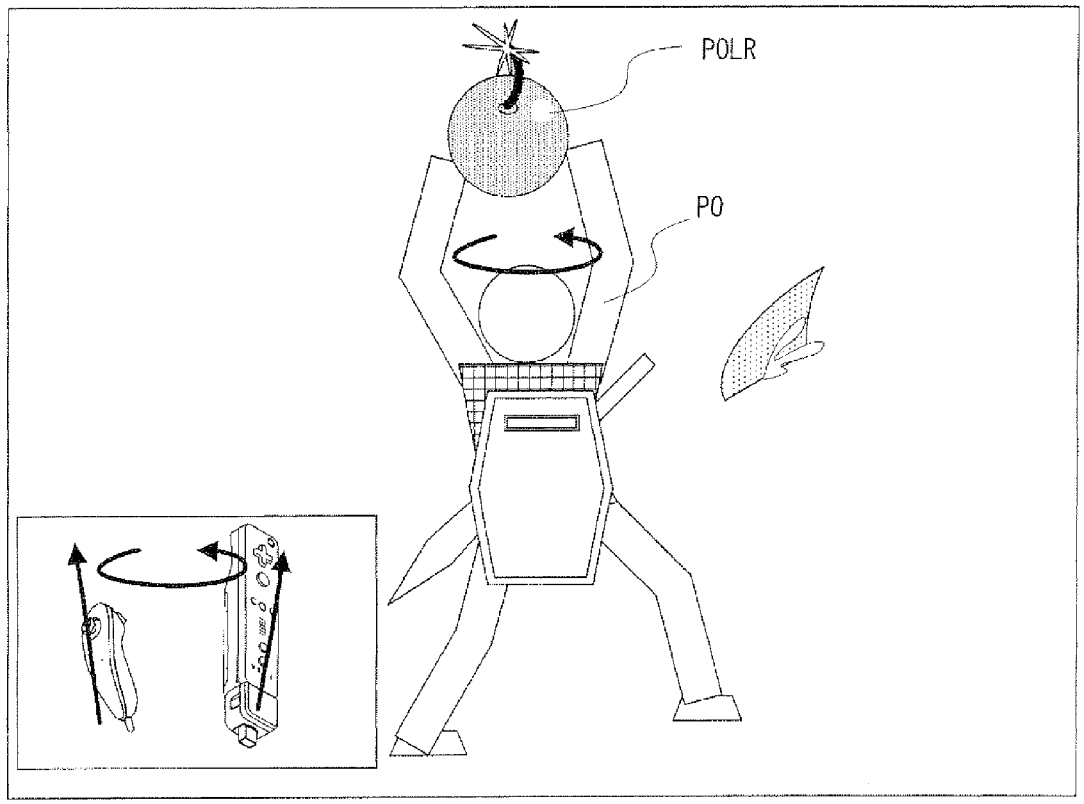

FIG. 31
(a)
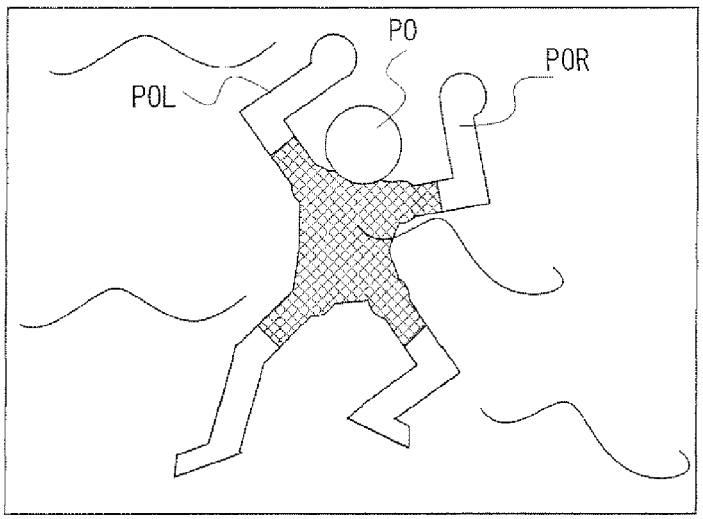
(b)
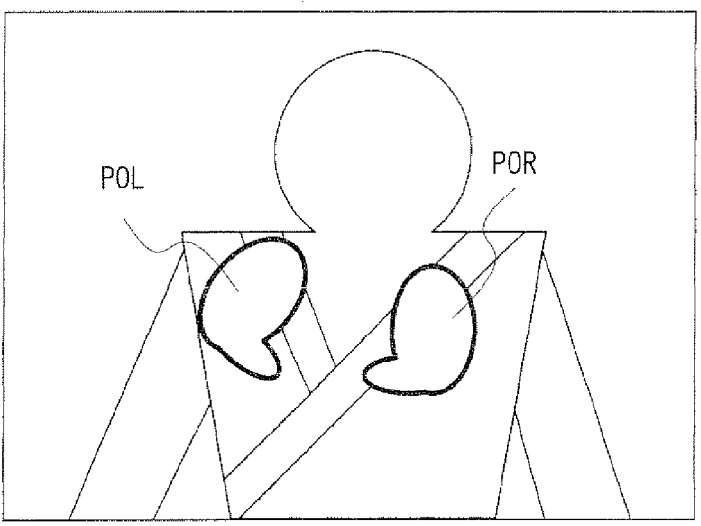
(c)
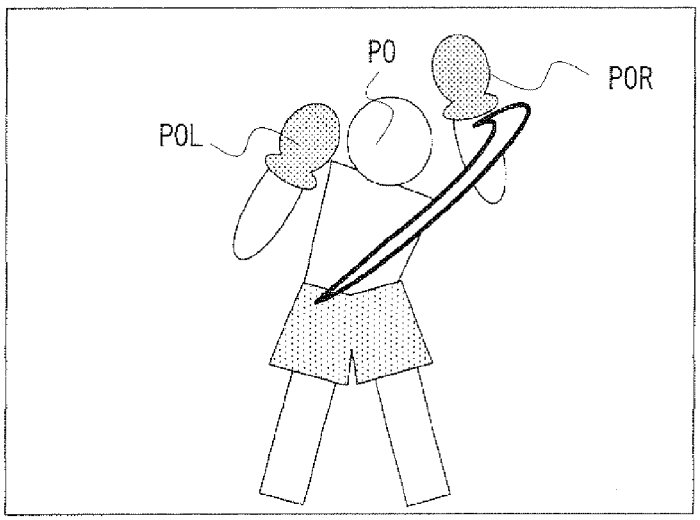

GAME PROGRAM AND GAME APPARATUS

CROSS REFERENCE OF RELATED APPLICATION

The disclosure of Japanese Patent Application No. 2008-181717 filed Jul. 11, 2008 is incorporated herein, by reference.

BACKGROUND OF THE INVENTION

1. Field of the Invention

The present invention relates to a game apparatus and a game program. More specifically, the present invention relates to a game apparatus and a game program capable of playing a game in response to a player adding a motion to a controller itself.

2. Description of the Related Art

One example of a game apparatus of such a kind is disclosed in a nonpatent literature 1 (http://www.nintendo.co.jp/wii/controllers/index.html). In the related, art, "Wii remote controller" (Wii: registered trademark) has a three-axis acceleration sensor for detecting changes of tilts and motions of itself. "Nunchaku" also has a three-axis acceleration sensor.

In order to perform the game on the outputs from the three-axis acceleration sensors, the player perform an operation by swinging and tilting the Wii remote controller and the Nunchaku while holding the Wii remote controller with one hand and the Nunchaku the other hand.

In the aforementioned nonpatent literature 1, since the acceleration sensor is used, the change of the attitude of the controller can be determined by the gravitational acceleration, but there is a problem of being unable to detect the rotation about a yaw direction, that is, in the direction of the gravitational force. Furthermore, if acceleration other than gravity is highly applied, there is a problem of being unable to accurately calculate the orientation. Furthermore, there is a problem that in a case that a quick rotating operation, not a slow change of the orientation, is performed, complex processing is required in order to determine an addition of acceleration.

SUMMARY OF THE INVENTION

Accordingly, it is a primary object of the present invention to provide a novel game apparatus and a novel game program.

Another object of the present invention is to provide a game apparatus and a game program capable of performing various operations by reflecting an orientation and a rotation on a game.

The present invention adopts the following features in order to solve the above-described problems.

A first invention is a storage medium readable by a computer of a game apparatus, the storage medium stores a game program, the game program causes the computer to function as an operation data acquiring means for acquiring operation data from a first input device including at least a first acceleration sensor and an angular velocity sensor, and a second input device including at least a second acceleration sensor; and a game processing means for performing game processing on the basis of at least first acceleration data in response to an output from the first acceleration sensor, second acceleration data in response to an output from the second acceleration sensor, and angular velocity data in response to an output from the angular velocity sensor in said operation data.

A second invention is a storage medium in the first invention, wherein the game processing means includes a first object controlling means for controlling a first controlling object within a game space on the basis of the first acceleration data and a second object controlling means for controlling a second controlling object within the game space on the basis of the second acceleration data.

A third invention is a storage medium in the first invention, wherein the game processing means includes a first object controlling means for controlling a first controlling object within a game space on the basis of both of the first acceleration data and the second acceleration data.

A fourth invention is a storage medium in the second invention, wherein the game processing means further includes an entire controlling means for controlling orientations or positions of the first controlling object and said second controlling object on the basis of the angular velocity data.

A fifth invention is a storage medium in the second invention or the third invention, wherein the first object controlling means further controls an orientation or a position of the first controlling object on the basis of the angular velocity data.

A sixth invention is a storage medium in the second invention or the third invention, wherein the first object controlling means performs a motion of moving the first controlling object within the game space, and further adds a rotation to the motion of the first controlling object on the basis of the angular velocity data.

A seventh invention is a storage medium in the second invention, wherein the first controlling object and the second controlling object each is a part of a player object within the game space, and the game processing means detects a rotation rotated about a predetermine axis of the first input device on the basis of the angular velocity data, and causes the player object to perform a specific action on the basis of the rotation.

An eighth invention is a storage medium in the third invention, wherein the first controlling object is a player object within the game space, and the game processing means detects a rotation rotated about a predetermine axis of the first input device on the basis of the angular velocity data, and causes the player object to perform a specific action on the basis of the rotation.

A ninth invention is a game apparatus comprising an operation data acquiring means for acquiring operation data from a first input device including at least a first acceleration sensor and an angular velocity sensor, and a second input device including at least a second acceleration sensor; and a game processing means for performing game processing on the basis of at least first acceleration data in response to an output from the first acceleration sensor, second acceleration data in response to an output from the second acceleration sensor, and angular velocity data in response to an output from the angular velocity sensor in said operation data.

According to the present invention, it is possible to provide a novel game program and a novel game apparatus. Furthermore, it is possible to provide a game program and a game apparatus capable of implementing various operations by means of a movement of the controllers.

BRIEF DESCRIPTION OF THE DRAWINGS

FIG. 2(A) is a perspective view of the first controller as seeing it from above rear, and FIG. 2(B) is a perspective view of the first controller as seeing it from below front.

FIG. 3 is an illustrative view showing an appearance of a second controller (Nunchaku) applied to the first embodiment, FIG. 3(A) is a perspective view of the second controller as seeing it from above rear, and FIG. 3(B) is a perspective view of the second controller as seeing it from below front.

FIG. 6 is an illustrative view showing an appearance of a gyro sensor unit applied to FIG. 1 embodiment, FIG. 6(A) is a perspective view of the gyro sensor unit as seeing it from above front, and FIG. 6(B) is a perspective view of the gyro sensor unit as seeing it from rear back.

FIG. 16 is an illustrative view showing a data format dealt by the gyro sensor unit, and FIG. 16(A) is an illustrative view showing a format of gyro data and FIG. 16(B) is an illustrative view showing a format of second controller data.

FIG. 19 is an illustrative view showing a table in which a control by a microcomputer of the gyro sensor unit is described every mode.

FIG. 20 is an illustrative view showing a mode selection applied to the gyro sensor unit, and FIG. 20(A) is an illustrative view showing a mode selection in a case that the application is a gyro-compatible type, and FIG. 20(B) is an illustrative view showing a mode selection in a case that the application is a gyro-non-compatible type.

FIG. 22 is illustrative views showing each movement of a water ski object within a game space in a personal watercraft game in this embodiment.

FIG. 23 is illustrative views showing an orientation controlling method of an object on the basis of acceleration in the game of this embodiment.

FIG. 24 is an illustrative view explaining an operation based on an angular velocity in the game of this embodiment.

FIG. 28 is an illustrative view explaining a second embodiment.

FIG. 31 is an illustrative view explaining a fifth embodiment.

DETAILED DESCRIPTION OF THE PREFERRED EMBODIMENTS

Figure 1:
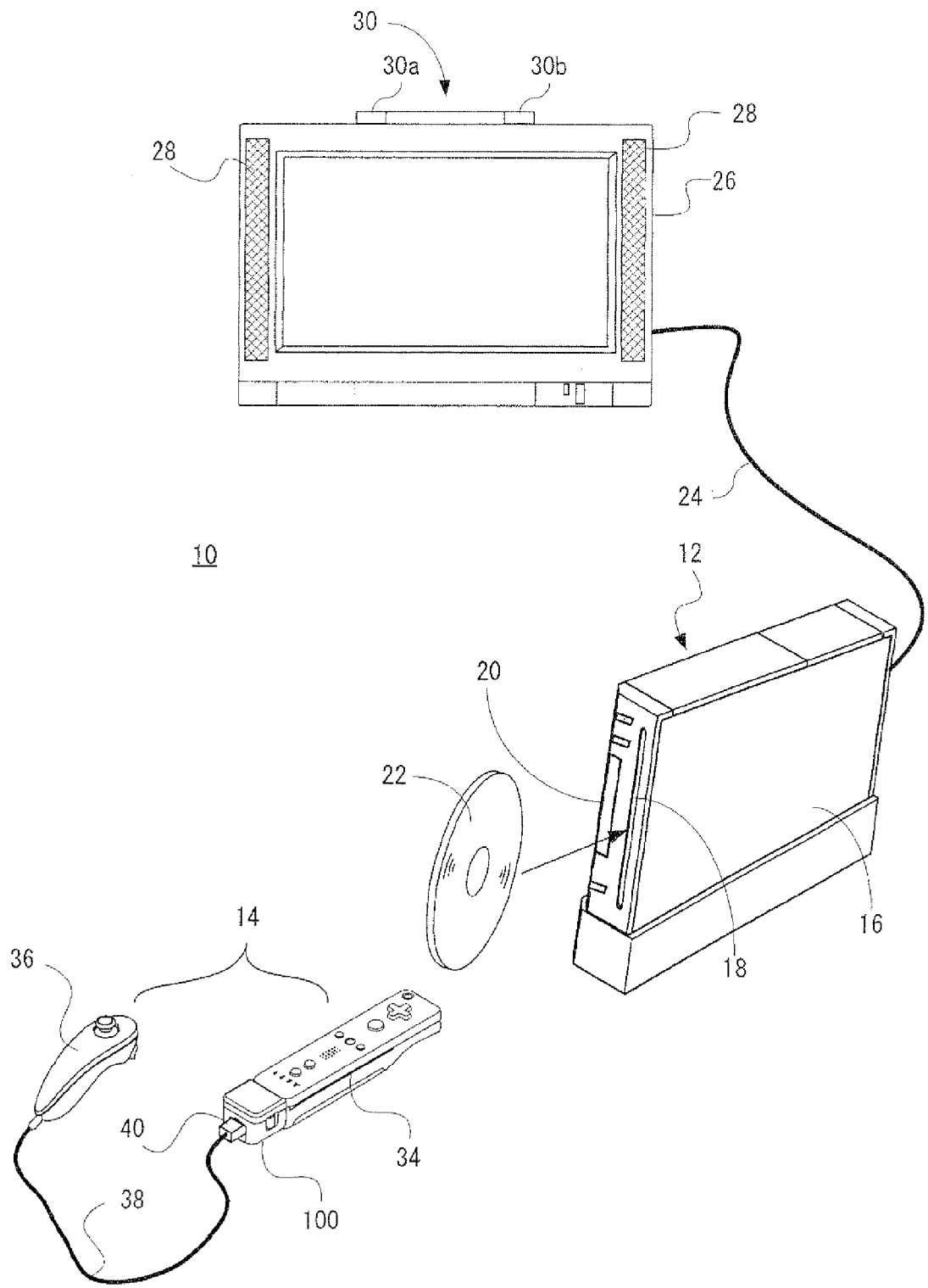
FIG. 1 is a block diagram showing a configuration of one embodiment of the present invention.

Referring to FIG. 1, a game system 10 of one embodiment of this invention includes a video game apparatus (hereinafter, referred to as "game apparatus") 12 and a controller 14. The controller 14 functions as an input device or an operating device by a user or a player. The game apparatus 12 and the controller 14 are connected by radio. For example, the wireless communication is executed according to a Bluetooth (registered trademark) standard, but may be executed according to other standards, such as an infrared ray communication, a wireless LAN, etc.

The game apparatus 12 includes a roughly rectangular parallelepiped housing 16, and the housing 16 is furnished with a disk slot 18 and an external memory card slot cover 20 on a front surface. An optical disk 22 (FIG. 10) as one example of an information storage medium storing game program and data, etc. is inserted from the disk slot 18 to be loaded into a disk drive 74 (see FIG. 10) within the housing 16. Inside the external memory card slot cover 20 is provided a connector for external memory card 48 (FIG. 10) through which a memory card (not shown) is inserted. The external memory card is employed for loading the game program, etc. read from the optical disk 22 to temporarily store it, storing (saving) game data (result data or proceeding data of the game) of the game played by means of the game system 10, and so forth. It should be noted that storing the game data described above may be performed on an internal memory such as a flash memory 64 (FIG. 10) in place of the external memory card.

The game apparatus 12 has an AV cable connector (not illustrated) on a rear surface of the housing 16, and by means of the connector, the game apparatus 12 is connected to a monitor (display) 26 via an AV cable 24. The monitor 26 is typically a color television receiver, and through the AV cable 24, a video signal from the game apparatus 12 is input to a video input terminal of the color television, and a sound signal is input to a sound input terminal thereof. Accordingly, a game image of a three-dimensional (3D) video game, for example, is displayed on the screen of the color television (monitor) 26, and a stereo game sound, such as a game music, a sound effect is output from integrated speakers 28.

Furthermore, around the monitor 26 (upper side of the monitor 26 in this embodiment), a marker unit 30 including two infrared ray LEDs (markers) 30a and 30b is provided. This marker unit 30 is connected to the game apparatus 12 through a power cable (not illustrated). Thus, power is supplied to the marker unit 30 from the game apparatus 12. This allows the markers 30a, 30b to emit light, and output infrared ray ahead of the monitor 26.

Here, the power supply of the game apparatus 12 is applied by a general AC adapter (not illustrated). The AC adapter is connected to a standard wall socket for home use, and converts a house current to a DC voltage signal small enough to drive the game apparatus 12. In another embodiment, batteries may be used as a power supply.

The controller 14, which is described in detail later, includes a first controller 34 and a second controller 36 each capable of being held with one hand and a gyro sensor unit 100 detachably attached to the first controller 34. On a rear end surface of the first controller 34, a connector 42 (FIG. 2(A), FIG. 11) is provided, and at an end of a cable 38 extending from the rear end of the second controller 36, a connector 40 (FIG. 1, FIG. 5, FIG. 11) is provided, and on a front end surface and a rear end surface of the gyro sensor unit 100, connectors 106 and 108 (FIG. 6(A), FIG. 6(B), FIG. 7 and FIG. 11) are respectively provided. The connector 106 at the front end surface of the gyro sensor unit 100 is connectable to the connector 42 of the first controller 34, and the connector 40 of the second controller 36 is connectable to the connector 42 of the first controller 34 or the connector 108 at the rear end surface of the gyro sensor unit 100.

By connecting the connector 106 to the connector 42, the gyro sensor unit 100 is physically and electrically connected to the first controller 34. From the gyro sensor unit 100 thus attached (connected as a single unit) to the first controller 34, angular velocity data indicating an angular velocity of the first controller 34 is output.

In a case that the gyro sensor unit 100 is thus attached to the first controller 34, the connector 40 of the second controller 36 is connected to the connector 108 at the rear end surface of the gyro sensor unit 100. That is, the connector 42 has a structure selectively connectable to either of the connector 106 or the connector 40, and the connector 40 has a structure of selectively connectable to either of the connector 42 or the connector 108. Accordingly, the connector 106 and the connector 108 provided to the gyro sensor unit 100 cannot actually be connected because of being a part of the same housing, but have shapes connectable with each other. Input data from the second controller 36 is applied to the first controller 34 via the cable 38 and the gyro sensor unit 100. The first controller 34 transmits controller data including input data from the first controller 34 itself, angular velocity data from the gyro sensor unit 100 and the input data from the second controller 36 to the game apparatus 12.

On the other hand, in a case that the connector 40 is connected to the connector 42, operation data or input data from the second controller 36 are applied to the first controller 34 via the cable 38, and the first controller 34 transmits controller data including input data from the first controller 34 itself and the input data from the second controller 36 to the game apparatus 12.

In the system here for transmitting input data from the first controller 34 and input data from the second controller 36, a data amount to be transmitted at a time may sometimes be designed so as not be added, but in a case that the gyro sensor unit 100 is added, by alternately outputting angular velocity data from the gyro sensor unit 100 and input data from the second controller 36 to the first controller 34, it is possible to transmit both of the data. The data control can be performed by the gyro sensor unit 100, so that the first controller 34 and the second controller 36 are not required to be changed in design.

Thus, the first controller 34 inputs a operation signal and operation data (data) from the second controller 36 and the gyro sensor unit 100 as well as a operation signal and operation data (data) from the controller 34 itself away from the game apparatus 12 in a wireless manner, and therefore, the first controller 34 may be called as a "remote controller". Furthermore, the second controller 36 is called under the nickname of "Nunchaku" from its shape, and thus will be called below too.

Thus, the gyro sensor unit 100 is an expanding unit for adding a gyro function to the first controller 34 by utilizing the existing first controller 34 and second controller 36 as it is.

In the game system 10, a user turns the power of the game apparatus 12 on for playing the game (or another application), then selects an appropriate optical disk 22 storing a video game (or another application the player wants to play), and loads the optical disk 22 into the disk drive 74 through the disk slot 18 of the game apparatus 12. In response thereto, the game apparatus 12 starts to execute a video game or another application on the basis of the software stored in the optical disk 22. The user operates the controller 14 in order to apply an input to the game apparatus 12.

Figure 2:
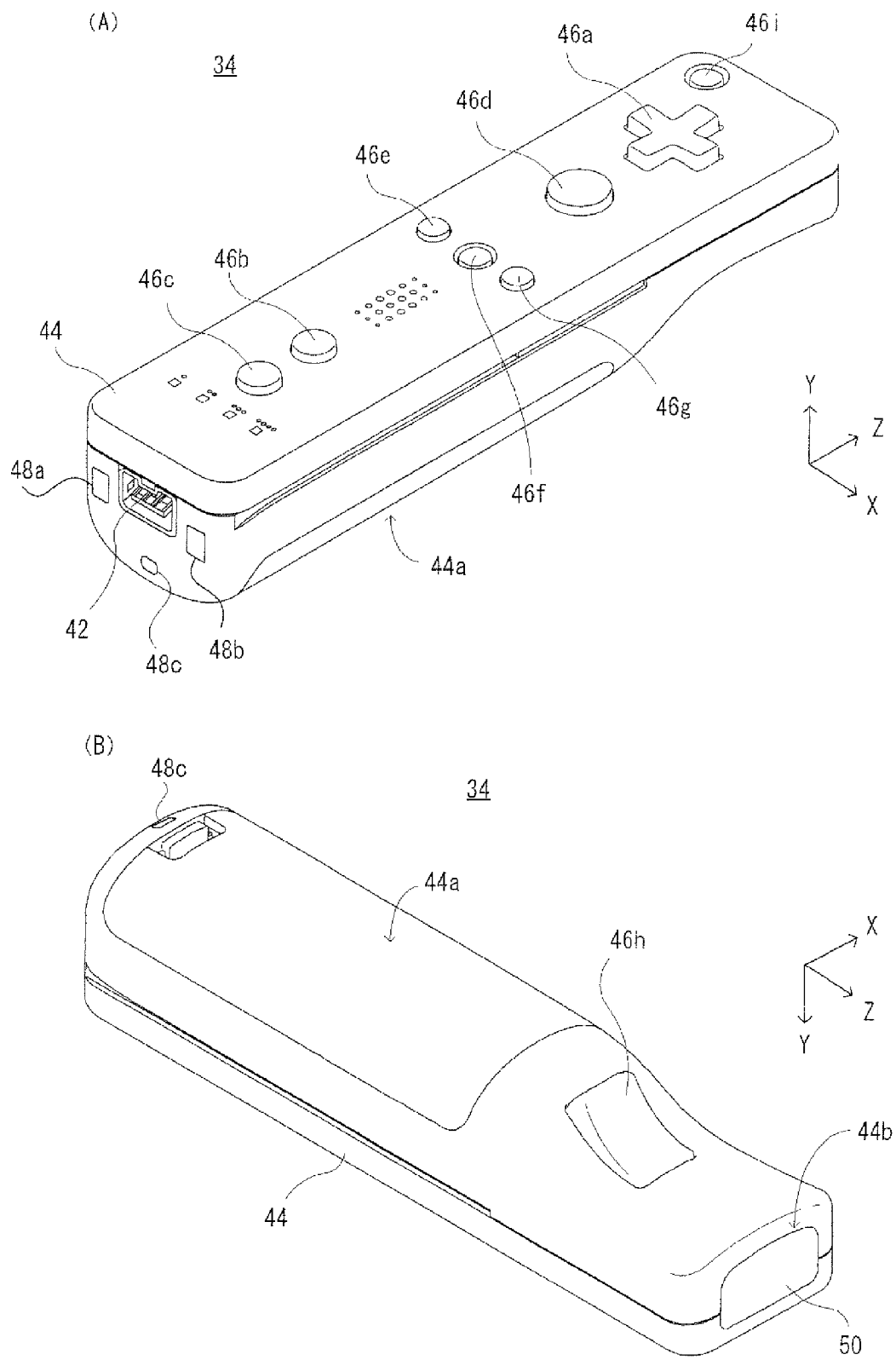
FIG. 2 is an illustrative view showing an appearance of a first controller (remote controller) applied to FIG. 1 embodiment.

FIG. 2 shows one example of an appearance of the remote controller or the first controller 34. FIG. 2(A) is a perspective view of the first controller 34 as seeing it from above rear, and FIG. 2(B) is a perspective view of the first controller 34 as seeing it from below front.

The first controller 34 has a housing 44 formed by plastic molding, for example. The housing 44 is formed into an approximately rectangular parallelepiped shape regarding a back and forth direction (Z-axis direction shown) as a longitudinal direction, and has a size small enough to be held by one hand of a child and an adult. As one example, the housing 44 has a length or a width approximately the same as that of a palm of a person. A player can perform a game operation by means of the first controller 34, that is, by pushing buttons provided on it and by changing a position and a direction of the first controller 34 itself.

The housing 44 is provided with a plurality of operation buttons. That is, on an upper face of the housing 44, there are provided a cross key 46a, a 1 button 46b, a 2 button 46c, an A button 46d, a – (minus) button 46e, a HOME button 46f, a + (plus) button or start button 46g. Meanwhile, on the bottom surface of the housing 44, a concave portion is formed, and on the reward inclined surface of the concave portion, a B button 46h is provided. Each of the buttons (switches) 46a-46h is assigned an appropriate function depending on a game program to be executed by the game apparatus 12. Furthermore, the housing 44 has a power switch 46i for turning on and off the power of the main body of the game apparatus 12 from a remote place on a top surface. The respective buttons (switches) provided on the first controller 34 may inclusively be indicated with the use of the reference numeral 46 as an operating means or an input means.

The cross key 46a is a four directional push switch, including four directions of front (or upper), back (or lower), right and left operation parts. By operating any one of the operation parts, it is possible to instruct a moving direction of a character or object (player character or player object) that is be operable by a player or instruct the moving direction of a cursor.

The 1 button 46b and the 2 button 46c are respectively push button switches, and are used for a game operation such as adjusting a viewpoint position and a viewpoint direction on displaying the 3D game image, i.e. a position and an image angle of a virtual camera. Alternatively, the 1 button 46b and the 2 button 46c can be used for the same operation as that of the A-button 46d and the B button 46h or an auxiliary operation.

The A-button switch 46d is the push button switch, and is used for causing the player character or the player object to take an action other than that instructed by a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth. Furthermore, the A button switch 46*d* is used for instructing decision of an icon or a button image pointed by the pointer (instruction image) on the game screen in a case that the controller 34 is used as a pointing device. For example, when the icon and the button image are decided, an instruction or a command (command of the game) set in advance corresponding thereto can be input.

The – button 46*e*, the HOME button 46*f*, the + button 46*g*, and the power switch 46*i* are also push button switches. The – button 46*e* is used for selecting a game mode. The HOME button 46*f* is used for displaying a game menu (menu screen). The + button 46*g* is used for starting (re-starting) or pausing a game. The power switch 46*i* is used for turning on/off a power supply of the game apparatus 12 by remote control.

In this embodiment, note that the power switch for turning on/off the controller 34 itself is not provided, and the controller 34 is set at on-state by operating any one of the operating means and the input means 46 of the controller 34, and when not operated for a certain period of time (30 seconds, for example) or more, the controller 22 is automatically set at off-state.

The B button 46*h* is also the push button switch, and is mainly used for inputting a trigger such as shooting and designating a position selected by the controller 34. In a case that the B button 46*h* is continued to be pushed, it is possible to make movements and parameters of the player object constant. In a fixed case, the B button 46*h* functions in the same way as a normal B-button, and is used for canceling the action or the command determined by the A-button 46*d*.

Within the housing 44, an acceleration sensor 84 (FIG. 11) for detecting accelerations in three-axis directions of X, Y and Z (that is, right and left direction, up and down direction and forward and reward direction) shown in FIG. 2 is provided. Alternatively, as an acceleration sensor 84, a two-axis acceleration sensor for detecting acceleration in any two directions out of the right and left direction, up and down direction and forward and reward direction may be used depending on the restriction on a shape of the housing 44, a way of holding the first controller 34, or the like. Under certain circumstances, one-axis acceleration sensor may be used.

On the front surface of the housing 44, a light incident opening 44*b* is formed, and inside the housing 44, an imaged information arithmetic section 50 is further provided. The imaged information arithmetic section 50 is made up of a camera for imaging infrared rays and an arithmetic operation portion for calculating coordinates of imaged objects within an image, and captures an object scene including the above-described markers 30*a* and 30*b* by the infrared rays to calculate position coordinates of the markers 30*a* and 30*b* within the object scene.

On the rear surface of the housing 44, the above-described connector 42 is provided. The connector 42 is utilized for connecting other equipment to the first controller 34. In this embodiment, the connector 42 is connected with the connector 40 of the second controller 36 or the connector 106 of the gyro sensor unit 100.

Moreover, on the rear surface of the housing 44, a pair of through holes 48*a* and 48*b* is formed in such positions as to be symmetrically with each other (X-axis direction) about the connector 42. The pair of through holes 48*a* and 48*b* is for being inserted with hooks 112Fa and 132Fb (FIG. 6(A)) for securing the gyro sensor unit 100 at the rear surface of the housing 44. At the rear surface of the housing 44, a through hole 48*c* for attaching a strap 56 (FIG. 5) is also provided.

FIG. 3 is an illustrative view showing one example of an appearance of the Nunchaku or the second controller 36 itself. FIG. 3(A) is a perspective view of the second controller 36 as seeing it from above rear, and FIG. 3(B) is a perspective view of the second controller 36 as seeing it from below front. In FIG. 3, the cable 38 of the second controller 36 is omitted here.

The second controller 36 has a housing 52 formed by plastic molding, for example. The housing 52 is formed into an approximately thin long elliptical shape in the forward and backward directions (Z-axis direction) when viewed from plane, and the width of the right and left direction (X-axis direction) at the rear end is narrower than that of the front end. Furthermore, the housing 52 has a curved shape as a whole when viewed from a side, and downwardly curved from a horizontal portion, at the front end to the rear end. The housing 52 has a size small enough to he held by one hand of a child and an adult similar to the first controller 34 as a whole, and has a longitudinal length (in the Z-axis direction) slightly shorter than that of the housing 44 of the first controller 34. Even with the second controller 36, the player can perform a game operation by operating buttons and a stick, and by changing a position and a direction of the controller itself.

At the front, end of the top surface of the housing 52, an analog joystick 54*a* is provided. At the end of the housing 52, a front edge slightly inclined backward is provided, and on the front edge are provided a C button 54*b* and a Z button 54*c* vertically (Y-axis direction in FIG. 3) arranged. The analog joystick 54*a* and the respective buttons 54*b* and 54*c* are assigned appropriate functions according to a game program to be executed by the game apparatus 12. The analog joystick 54*a* and the respective buttons 54*b* and 54*c* provided to the second controller 36 may inclusively be denoted by means of the reference numeral 54.

Inside the housing 52 of the second controller 36, an acceleration sensor 86 (FIG. 11) is provided. As the acceleration sensor 86, an acceleration sensor similar to the acceleration sensor 84 in the first controller 34 is applied. More specifically, a three-axis acceleration sensor is applied in this embodiment, and detects accelerations in each of the three axis directions such as an up and down direction (Y-axial direction shown), a right and left direction (X-axial direction shown), and a forward and backward direction (Z-axial direction shown) of the second controller 36. Accordingly, similar to the case of the first controller 34, proper arithmetic process is performed on the detected acceleration to thereby calculate a tilt and a rotation of the second controller 36 and an attitude of the acceleration sensor 86 with respect to the direction of gravity. Furthermore, it is possible to calculate a motion applied to the first controller 34 by swinging, etc. similarly.

Figure 4:
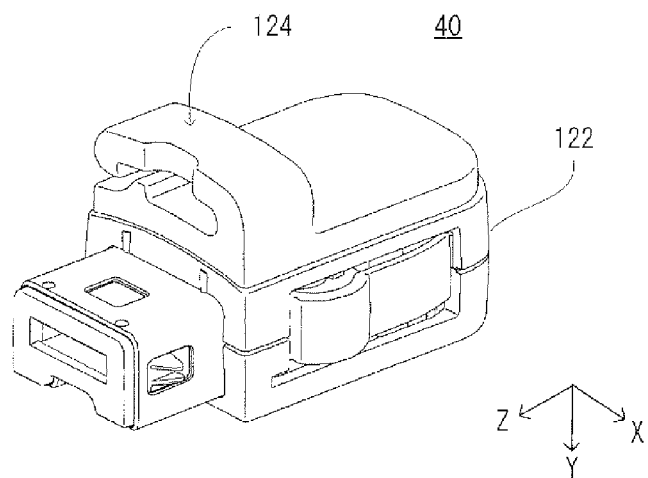
FIG. 4 is an illustrative view showing an appearance of a connector of the second controller.
Figure 5:
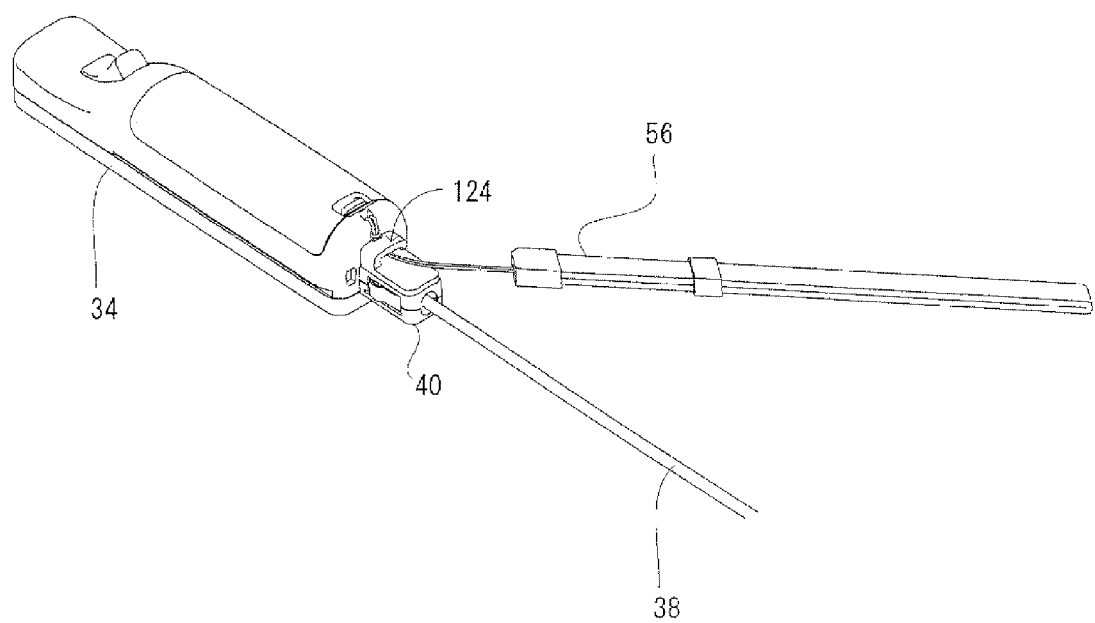
FIG. 5 is an illustrative view showing a manner in which a cord of a strap attached to the first controller is hang and retained with a hook of the connector in a state that the connector of the second controller is connected to the first controller.

FIG. 4 shows one example of an appearance of the connector 40 of the second controller 36. FIG. 4 is a perspective view of the connector 40 as seeing it from below front. Here also, the cable 38 is omitted. The connector 40 has a housing 122 formed by a plastics molding, for example. At the bottom surface of the housing 122, a hook 124 is provided. The hook 124 is for intrinsically hanging and retaining a cord of the strap 56 attached to the first controller 34 when the connector 40 is directly connected to the first controller 34 (of the connector 42) as shown in FIG. 5.

FIG. 6 shows one example of an appearance, of the gyro sensor unit 100. FIG. 6(A) is a perspective view of the gyro sensor unit 100 as seeing it from above front, and FIG. 6(B) is a perspective view of the gyro sensor unit 100 as seeing it from rear back.

The gyro sensor unit 100 has a housing 110 formed by a plastics molding, for example. The housing 110 has an appropriately rectangular parallelepiped shape, and the length is ⅕ of the length of the housing 44 of the first controller 34, and the width and thickness are approximately the same as those of the housing 44. The player can play a game operation by changing a position and a direction of the first controller 34 itself even if the first controller 34 is attached with the gyro sensor unit 100.

On the front surface and the rear surface of the housing 110, the above-described connectors 106 and 108 are provided, on the side surfaces of the housing 110, a pair of release buttons 112a and 112b are provided, and the bottom surface of the housing 110, a lock switch 114 is provided. An approximately sphere concave portion 110a is provided from the end of the front surface of the housing 110 to the bottom surface such that the through hole 48c for the strap 56 is exposed in a state that the first controller 34 is attached with the gyro sensor unit 100 (FIG. 8).

A pair of hooks 112Fa and 112Fb which are respectively associated with the release buttons 112a and 112b are provided the front surface of the housing 110 at positions symmetrically with each other in a horizontal direction (X-axis direction) about the connector 106. When the connector 106 is connected to the connector 42 in order to attach the gyro sensor unit 100 to the first controller 34, the pair of hooks 112Fa and 112Fb are inserted to the pair of through holes 48a and 48b (FIG. 2(A)) at the rear surface of the housing 44, and the pawls of the hooks 112Fa and 112Fb are engaged with the inner wall of the housing 44. Thus, the gyro sensor unit 100 is fixed to the rear surface of the first controller 34.

Figure 8:
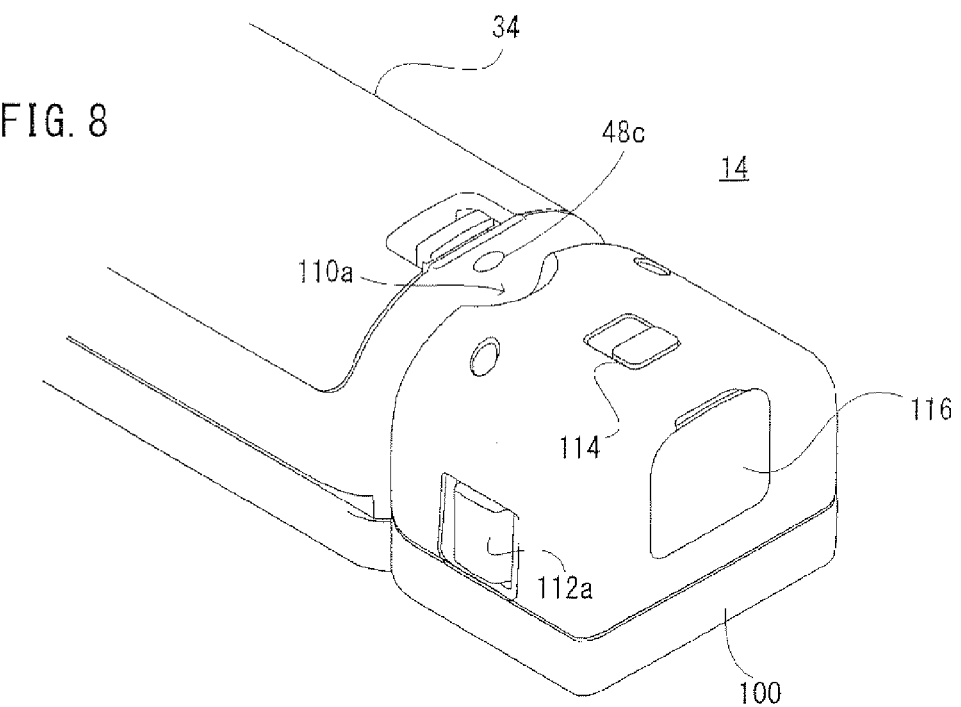
FIG. 8 is an illustrative view showing a state in which the gyro sensor unit is connected to the first controller.

FIG. 8 shows the gyro sensor unit 100 thus attached to the first controller 34. When the pair of release buttons 112a and 112b are pushed in this state, the engagement of the pawls are released to allow the gyro sensor unit 100 to be detached from the first controller 34.

A lock switch 114 is a sliding switch for locking such the release buttons 112a and 112b. The release buttons 112a and 112b cannot be pushed (locked state) when the lock switch 114 is in a first position (toward the rear side, for example), and the release buttons 112a and 112b can be pushed (released state) when the lock switch 114 is in a second position (toward the front, for example). Within the housing 110, locking springs 118a and 118b (FIG. 7) are provided and constructed so as to be repulsed when the release button 112a and 112b are pushed, and so as to maintain the engaged state when the release button 112a and 112b are not pushed. Thus, in order to remove the gyro sensor unit 100, the user has to push the release buttons 112a and 112b after sliding the lock switch 114 from the first position to the second position.

Since the gyro sensor unit 100 is attached to the rear surface of the first controller 34, a centrifugal force applied to the gyro sensor unit 100 during the game is exclusively worked such that the gyro sensor unit 100 is pressed against the first controller 34. Furthermore, the gyro sensor unit 100 is fixed to the rear surface of the first controller 34 by the hooks 112Fa and 112Fb while the lock switch 114 is provided to the release buttons 112a and 112b for releasing the hooks 112Fa and 112Fb, and therefore, even during operating the game, it is possible to bring about a tightly secured state between the gyro sensor unit 100 and the first controller 34.

On the rear surface of the housing 110, a concave portion 110b capable of housing the connector cover 116 to be attached to the connector 108 is provided on the periphery of the connector 108. The connector cover 116 has a narrow thin (that is, can be bended) protrusion 116a extending in a forward and backward (Z-axis direction) direction on the one end of the main surface. The end portion of the protrusion 116a is engaged with the housing 110, and the connector cover 116 is captive from the housing 110 in a state that it is removed from the connector 108.

Figure 9:
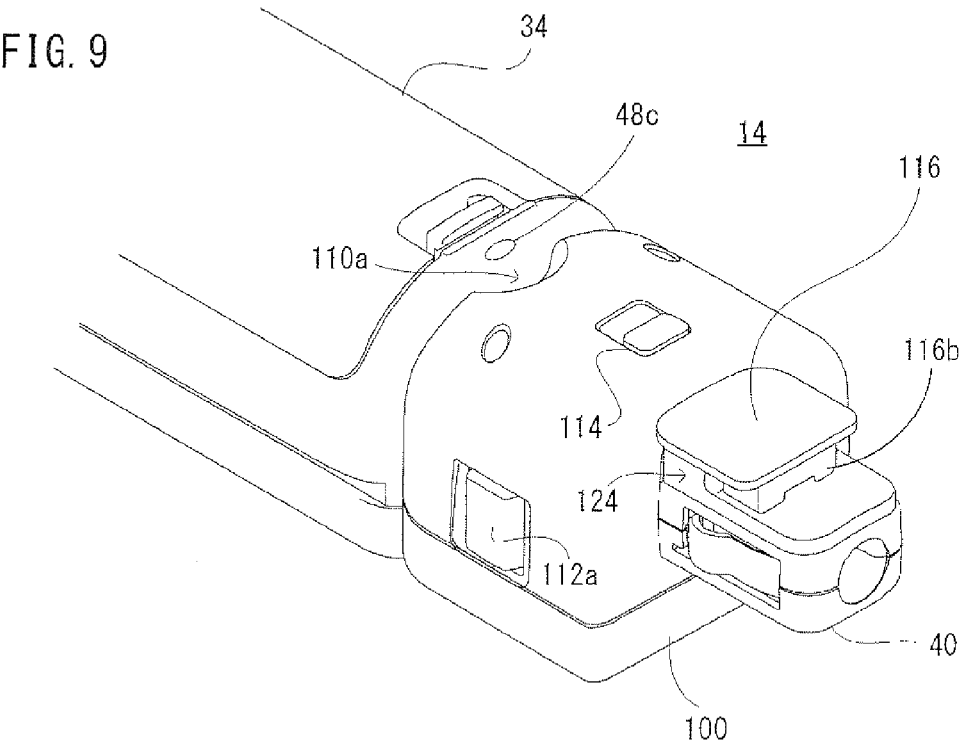
FIG. 9 is an illustrative view showing a state in which the second controller is connected to the first controller via the gyro sensor unit.

The connector cover 116 has a narrow thick (that is, is hard to bend) protrusion 116b extending in a right and left direction (X-axis direction) on the other end of the main surface. The thickness of the protrusion 116b (height of the Z-axis direction) is approximately the same as the thickness (height of the Y-axis direction) of the hook 124 (FIG. 4) provided to the connector 40 of the second controller 36. In a case that the second controller 36 is connected to the first controller 34 via the gyro sensor unit 100, the main surface of the connector cover 116 is made level to be engaged with the side surface of the hook 124 of the connector 40 as shown in FIG. 9. By thus incorporating the connector cover 116 detached from the connector 108 into the connector 40, the connector 40 is tightly secured to the gyro sensor unit 100 as well as is improved in operability and appearance.

Figure 7:
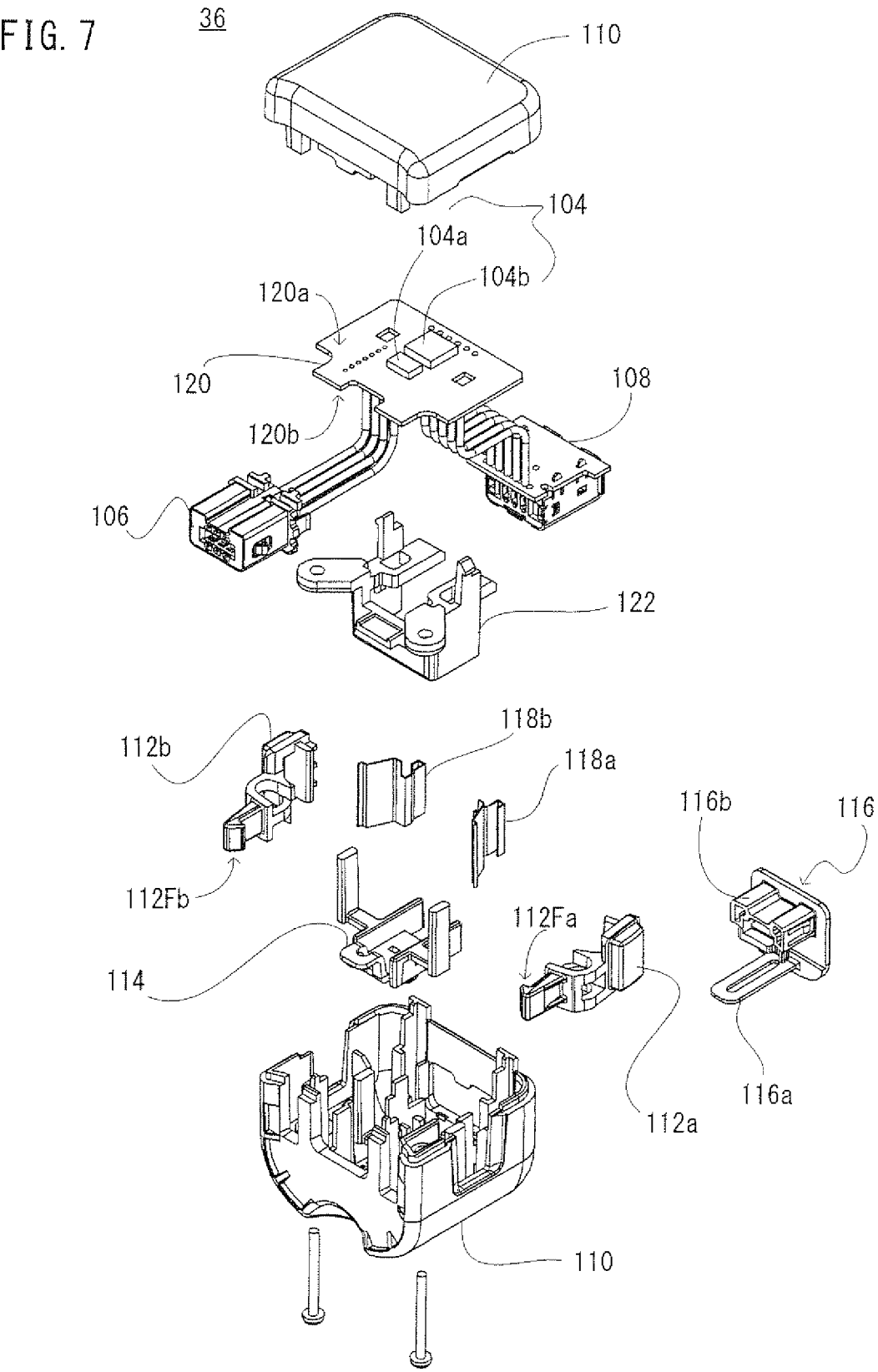
FIG. 7 is an illustrative view showing structure of the gyro sensor unit.

FIG. 7 shows one example of a structure of the gyro sensor unit 100. The gyro sensor unit 100 also has a gyro substrate 120 and a support member 122 in addition to the above-described housing 110, connectors 106 and 108, release buttons 112a and 112b, hooks 112Fa and 112Fb, lock switch 114, connector cover 116 and locking springs 118a and 118b. The gyro substrate 120 is connected to each of the connectors 106 and 108 by a signal wire, and the support member 122 supports the gyro substrate 120 and the connectors 106 and 108.

The gyro substrate 120 is provided with a gyro sensor 104. The gyro sensor 104 is made up of two chips including one-axis gyro sensor 104a and two-axis gyro sensor 104b. The gyro sensor 104a is for detecting an angular velocity (angular velocity about the Y axis) relating to a yaw angle, and the gyro sensor 104b is for detecting two angular velocities (angular velocity about the Z axis and angular velocity about the X axis) relating to a roll angle and a pitch angle. The gyro sensors 104a and 104b are horizontally provided and arranged in parallel on a top surface 120a of the gyro substrate 120.

Here, the arrangement of the gyro sensors 104a and 104b is not restricted to that shown in FIG. 7. In another embodiment, the gyro sensor 104a is horizontally provided on one of the top surface 120a and the bottom surface 120b of the gyro substrate 120, and the gyro sensor 104b is horizontally provided on the other of the top surface 120a and the bottom surface 120b of the gyro substrate 120 so as to be opposed to the gyro sensor 104a with the gyro substrate 120 therebetween. In still another embodiment, the gyro sensor 104a is vertically provided on one of the top surface 120a and the bottom surface 120b of the gyro substrate 120, and the gyro sensor 104b is horizontally provided on the other of the top surface 120a and the bottom surface 120b of the gyro substrate 120.

Furthermore, the gyro sensor 104 is not restricted to be made up of two chips, may be made up of three one-axis gyro sensors (three chips), or may be made up of one three-axis gyro sensor (one chip). In either case, a position and a direction of each of the chips are decided so as to properly detect the above-described three angular velocities. In addition, under certain circumstances, the gyro sensor 104 may be made up of one two-axis gyro sensor, or may be mad up of one or two one-axis gyro sensor.

It should, be noted that the shapes of the first controller 34 shown in FIG. 2, the second controller 36 shown in FIG. 3 and the gyro sensor unit 100 shown in FIG. 6, and the shape, the number and the setting position of the button (switch or stick, etc.) are merely one example, and may be changed to another shape, number and setting position, etc. as necessary.

Here, the sensor is a gyro sensor (angular velocity sensor) in a preferred embodiment, but may be other motion sensors, such as an acceleration sensor, a velocity sensor, a displacement sensor, a rotation angle sensor, etc. Besides the motion sensors, there are a slant sensor, an image sensor, an optical sensor, a pressure sensor, a magnetic sensor, a temperature sensor, etc., and in a case that either sensor is added, an operation by utilizing an object to be detected by the sensor is made possible. In a case that either sensor is utilized, the operating device can be added with a sensor while utilizing another device conventionally connected to the operating device as it is.

In addition, the power source of the controller 14 is applied by a battery (not illustrated) which is replaceably accommodated in the first controller 34. The power is supplied to the second controller 36 via the connector 40 and the cable 38. If the gyro sensor unit 100 is connected to the first controller 34, the power is supplied to the gyro sensor unit 100 via the connectors 42 and 106. Alternatively, if the second controller 36 is connected to the gyro sensor unit 100, a part of the power supplied from the first controller 34 to the gyro sensor unit 100 is also applied to the second controller 36 via the connector 108, the connector 40 and the cable 38.

Figure 10:
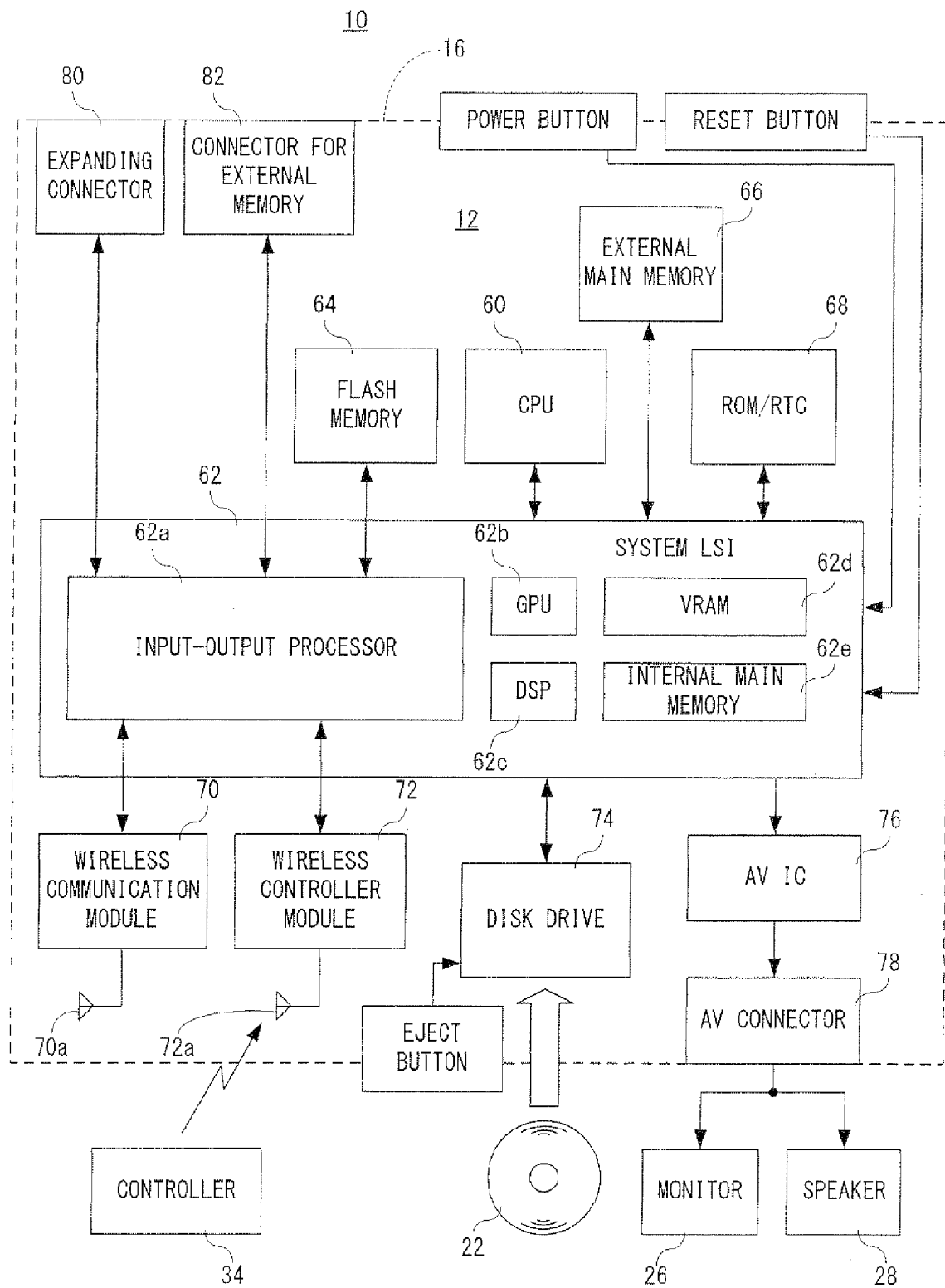
FIG. 10 is a block diagram showing an electric configuration of FIG. 1 embodiment.

FIG. 10 shows an electric configuration of the game system 10. Although illustration is omitted, respective components within the housing 14 are mounted on the printed-circuit board. As shown in FIG. 10, the game apparatus 12 is provided with a CPU 60 functioning as a game processor. Furthermore, the CPU 60 is also connected with a system LSI 162. The system LSI 162 is connected with an external main memory 66, a ROM/RTC 68, a disk drive 74 and an AV IC 76.

The external main memory 66 is utilized as a work area and a buffer area of the CPU 60 by storing programs such as a game program, etc. and various data. The ROM/RTC 68, which is a so-called boot ROM, is incorporated with a program for activating the game apparatus 12, and is provided with a time circuit for counting a time. The disk drive 74 reads a program, image data, sound data, etc. from the optical disk 22, and writes them in an internal main memory 62e described later or the external main memory 66 under the control of the CPU 60.

The system LSI 62 is provided with an input-output processor 62a, a GPU (Graphics Processor Unit) 62b, a DSP (Digital Signal Processor) 62c, a VRAM 62d and the internal main memory 62e, and these are connected with one another by internal buses although illustration is omitted. Transmission and reception and download of data are described later.

The GPU 62b is made up of a part of a drawing means, and receives a graphics command (construction command) from the CPU 60 to generate game image data according to the command. Additionally, the CPU 60 applies an image generating program required for generating game image data to the GPU 62b in addition to the graphics command, Although illustration is omitted, the GPU 62b is connected with the VRAM 62d as described above. The GPU 62b accesses the VRAM 62d to acquire data (image data: data such as polygon data, texture data, etc.) required to execute the construction command. Here, the CPU 60 writes image data required for drawing to the VRAM 62d via the GPU 62b. The GPU 62b accesses the VRAM 62d to produce game image data for drawing.

In this embodiment, a case that the GPU 62b generates game image data is explained, but in a case of executing an arbitrary application except for the game application, the GPU 62b generates image data as to the arbitrary application.

Furthermore, the DSP 62c functions as an audio processor, and generates audio data corresponding to a sound, a voice, music, or the like to be output from the speaker 28 by means of the sound data and the sound wave (tone) data stored in the internal main memory 62e and the external main memory 66.

The game image data and audio data which are generated as described above are read by the AV IC 76, and output to the monitor 26 and the speaker 28 via the AV connector 78. Accordingly, a game screen is displayed on the monitor 26, and a sound (music) necessary for the game is output from the speaker 28.

Furthermore, the input-output processor 62a is connected with a flash memory 64, a wireless communication module 70 and a wireless controller module 72, and is also connected with an expanding connector 80 and a connector for external memory card 82. The wireless communication module 70 is connected with an antenna 70a, and the wireless controller module 72 is connected with an antenna 72a.

Although illustration is omitted, the input-output processor 62a can communicate with other game apparatuses and various servers to be connected to a network (not shown) via the wireless communication module 70. It should be noted that it is possible to directly communicate with another game apparatus without going through the network. The input-output processor 62a periodically accesses the flash memory 64 to detect the presence or absence of data (referred to as data to be transmitted) being required to be transmitted to a network, and transmits it to the network via the wireless communication module 70 and the antenna 70a in a case that data to be transmitted is present. Furthermore, the input-output processor 62a receives data (referred to as received data) transmitted from another game apparatuses via the network, the antenna 70a and the wireless communication module 70, and stores the received data in the flash memory 64. In a case that the received data does not satisfy a constant condition, the received data is abandoned as it is. In addition, the input-output processor 62a receives data (download data) downloaded from the download server via the network, the antenna 70a and the wireless communication module 70, and stores the download data in the flash memory 64.

Furthermore, the input-output processor 62a receives input data transmitted from the controller 34 via the antenna 72a and the wireless controller module 72, and (temporarily) stores it in the buffer area of the internal main memory 62e or the external main memory 66. The input data is erased from the buffer area after being utilized in the processing by the CPU 60 (game processing, for example).

In this embodiment, as described above, the wireless controller module 72 makes communications with the controller 34 in accordance with Bluetooth standards. This makes it possible for the game apparatus 12 to not only fetch data from the controller 34 but also to transmit a predetermined command to the controller 34 to thereby control a motion of the controller 34 from the game apparatus 12.

In addition, the input-output processor 62a is connected with the expanding connector 80 and the connector for external memory card 82. The expanding connector 80 is a connector for interfaces, such as USB, SCSI, etc., and can be connected with medium such as an external storage and peripheral devices such as another controller different form the controller 34. Furthermore, the expanding connector 80 is connected with a cable LAN adaptor, and can utilize the cable LAN in place of the wireless communication module 70. The connector for external memory card 82 can be connected with an external storage like a memory card. Thus, the input-output processor 62a, for example, accesses the external storage via the expanding connector 80 and the connector for external memory card 82 to store and read the data.

Although a detailed description is omitted, when the power button is turned on, the system LSI 162 is set in a mode of a normal energized state in which the respective components of the game apparatus 12 are supplied with power through an AC adapter not shown (referred to as "normal mode"). On the other hand, when the power button is turned off, the system LSI 162 is set to a mode in which a part of the components of the game apparatus 12 is supplied with power, and the power consumption is reduced to minimum, (hereinafter referred to as "standby mode").

In this embodiment, in a case that the standby mode is set, the system LSI 62 issues an instruction to stop supplying the power to the components except for the input-output processor 62a, the flash memory 64, the external main, memory 66, the ROM/RTC 68, the radio communication module 70, and the radio controller module 72. Accordingly, in this embodiment, the CPU 60 never executes an application in the standby mode.

Although the system LSI 62 is supplied with power even in the standby mode, supply of clocks to the GPU 62b, the DSP 62c and the VRAM 62d are stopped so as not to be driven, realizing reduction in power consumption.

Although illustration is omitted, inside the housing 14 of the game apparatus 12, a fan is provided for excluding heat of the IC, such as the CPU 60, the system LSI 62, etc. to outside. In the standby mode, the fan is also stopped.

However, in a case that the standby mode is not desired, when the power button is turned off, by making the standby mode unusable, the power supply to all the circuit components are completely stopped.

Furthermore, switching between the normal mode and the standby mode can be performed by turning on and off the power switch 80i of the controller 34 by remote control. If the remote control is not performed, setting is made such that the power supply to the radio controller module 72a is not performed in the standby mode.

The reset button is also connected to the system LSI 62. When the reset button is pushed, the system LSI 62 restarts the activation program of the game apparatus 12. The eject button is connected to the disk drive 74. When the eject button 74 is pushed, the optical disk 22 is removed from the disk drive 74.

Figure 11:
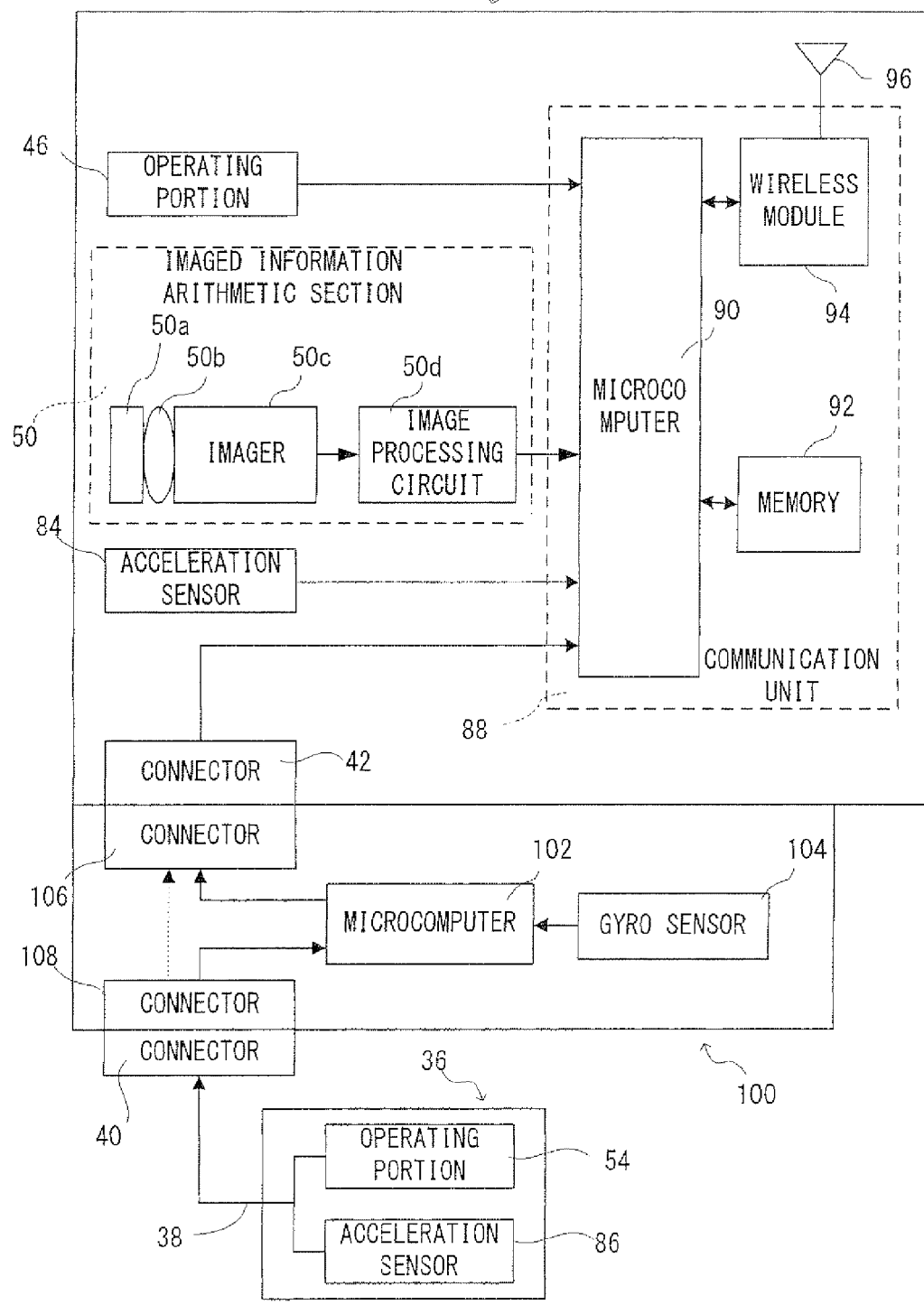
FIG. 11 is a block diagram showing an electric configuration of all the controllers applied to FIG. 1 embodiment.

FIG. 11 shows one example of an electric configuration of the controller 14 as a whole when the first controller 34 and the second controller 36 are connected via the gyro sensor unit 100.

The first controller 34 incorporates a communication unit 88, and the communication unit 88 is connected with the operating portion 46, the imaged information arithmetic section 50, the acceleration sensor 84, and the connector 42. The operating portion 46 indicates the above-described operation buttons or operation switches 46a-46i. When the operating portion 46 is operated, data indicating the operation is applied to the communication unit 88. From the imaged information arithmetic section 50, data indicating the position coordinates of the markers 30a and 30b are output to the communication unit 88.

In addition, as described above, the controller 34 is provided with the imaged information arithmetic section 50. The imaged information arithmetic section 50 is constituted by an infrared filter 50a, a lens 50b, an imager 50c and an image processing circuit 50d. The infrared filter 50a passes only infrared rays from the light incident from the light incident opening ahead of the first controller 34. As described above, the markers 30a and 30b placed near (around) the display screen of the monitor 26 are infrared LEDs for outputting infrared lights ahead of the monitor 26. Accordingly, by providing the infrared filter 50a, it is possible to image the image of the markers 30a and 30b more accurately. The lens 50b condenses the infrared rays passing thorough the infrared filter 50a to emit them to the imager 50c. The imager 50c is a solid imager, such as a CMOS sensor and a CCD sensor, for example, and images the infrared rays condensed by the lens 50b. Accordingly, the imager 50c images only the infrared rays passing through the infrared filter 50a to generate image data. Hereafter, the image imaged by the imager 50c is called an "imaged image". The image data generated by the imager 50c is processed by the image processing circuit 50d. The image processing circuit 50d calculates positions of objects to be imaged (markers 30a and 30b) within the imaged image, and outputs marker coordinates data indicating the positions to the processor 70 as imaged data (marker coordinate data described below) for each four predetermined time (one frame, for example). It should be noted that a description of the image processing circuit 50d is made later.

Figure 12:
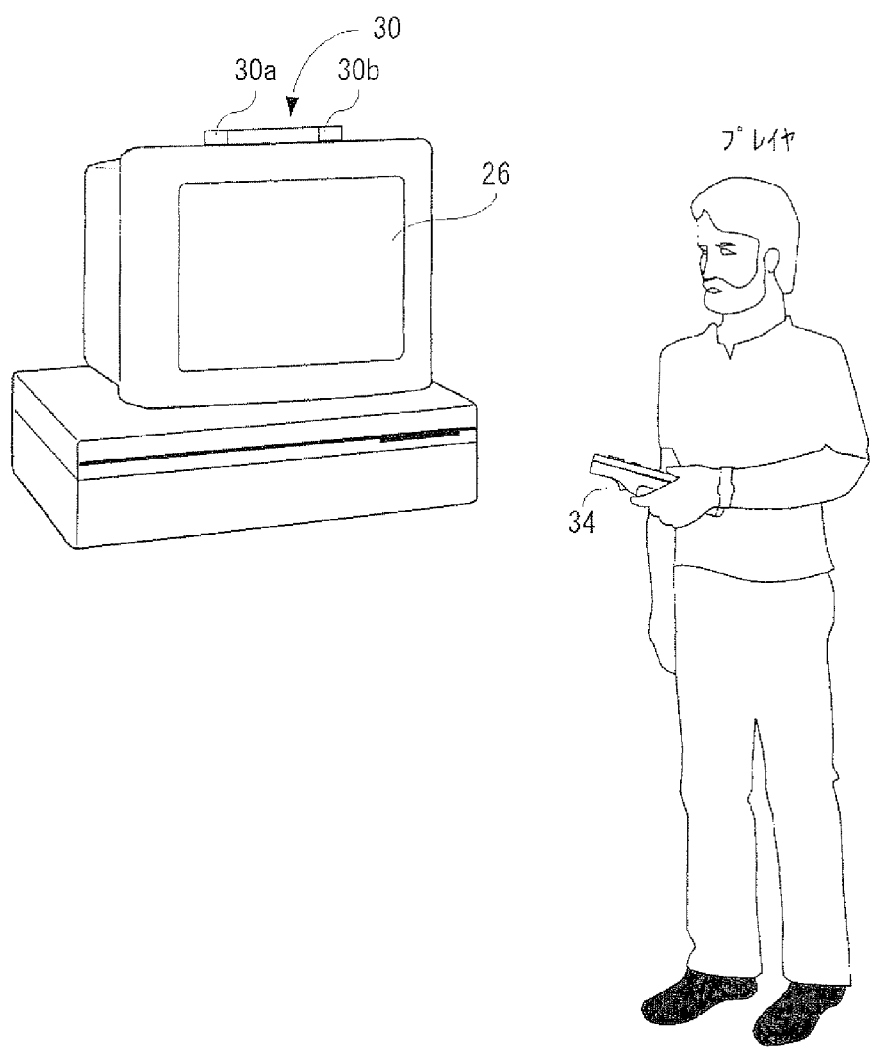
FIG. 12 is an illustrative view summarizing a state when a game is played by utilizing the controller connected with the gyro sensor unit shown in FIG. 1.

FIG. 12 is an illustrative view summarizing a state when a player plays a game by utilizing the controller 34. It should be noted that the same is true for a case that another application is executed or a DVD is reproduced as well as a game playing. As shown in FIG. 12, when playing the game by means of the controller 34 in the video game system 10, the player holds the controller 34 with one hand. Strictly speaking, the player holds the controller 34 in a state that the front end surface (the side of the incident light opening 44b of the light imaged by the imaged information arithmetic section 50) of the controller 34 is oriented to the markers 30a and 30b. Here, as can be understood from FIG. 1, the markers 30a and 30b are placed in parallel with the horizontal direction of the screen of the monitor 26. In this state, the player performs a game operation by changing a position on the screen indicated by the controller 34, and changing a distance between the controller 34 and each, of the markers 30a and 30b.

Although it is unclear in FIG. 12, the same is true for a case that the above-described gyro sensor unit 100 is connected to the controller 34.

Figure 13:
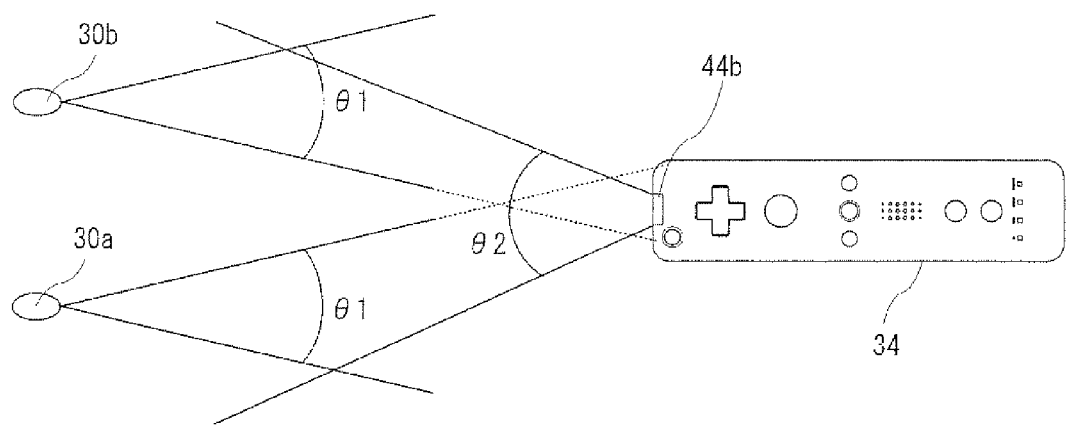
FIG. 13 is an illustrative view showing viewing angles of the markers and the controller shown in FIG. 1.

FIG. 13 is a view explaining viewing angles between the respective markers 30a and 30b, and the first controller 34. As shown in. FIG. 13, each of the markers 30a and 30b emits infrared ray within a range of a viewing angle 81. Also, the imager 50c of the imaged information arithmetic section 50 can receive incident light within the range of the viewing angle θ2 taking the line of sight of the first controller 34 as a center. For example, the viewing angle θ1 of each of the markers 30a and 30b is 34° (half-value angle) while the viewing angle θ2 of the imager 50c is 42°. The player holds the first controller 34 such that the imager 50c is directed and positioned so as to receive the infrared rays from the markers 30a and 30b. More specifically, the player holds the first controller 34 such that at least one of the markers 30a and 30b exists in the viewing angle θ2 of the imager 50c, and the first controller 34 exists in at least one of the viewing angles θ1 of the marker 30a or 30b. In this state, the first controller 34 can detect at least one of the markers 30a and 30b. The player can perform a game operation, by changing the position and the attitude of the first controller 34 in the range satisfying the state.

If the position and the attitude of the first controller 34 are out of the range, the game operation based on the position and the attitude of the first controller 34 cannot be performed. Hereafter, the above-described range is called an "operable range".

Figure 14:
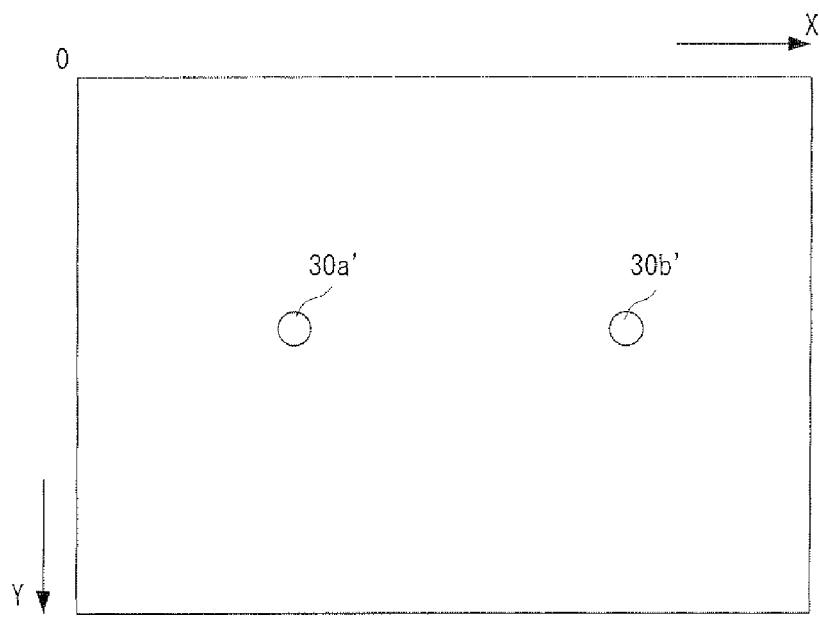
FIG. 14 is an illustrative view showing one example of an imaged image including object images.

If the first controller 34 is held within the operable range, an image of each of the markers 30a and 30b is imaged by the imaged. Information arithmetic section 50. That is, the imaged image obtained by the imager 50c includes an image (object image) of each of the markers 30a and 30b as an object to be imaged. FIG. 14 is a view showing one example of the imaged image including an object image. The image processing circuit 50d calculates coordinates (marker coordinates) indicative of the position of each of the markers 30a and 30b in the imaged image by utilizing the image data of the imaged image including the object images.

Since the object images appear as a high-Intensity part in the image data of the imaged image, the image processing circuit 50d first detects the high-intensity part as a candidate of the object image. Next, the image processing circuit 50d determines whether or not the high-intensity part is an object image on the basis of the size of the detected high-intensity part. The imaged image may include images other than the object image due to sunlight through a window and light of a fluorescent lamp in the room, as well as the two object images 30a' and 30b' corresponding to the two markers 30a, 30b as object images. The determination processing whether or not the high-intensity parts are the object images is executed for discriminating the images 30a' and 30b' as object images from other than these, and accurately detecting the object images. More specifically, in the determination process, it is determined whether or not each of the detected high-intensity parts is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 50d calculates the position of the high-intensity part. More specifically, the barycenter position of the high-intensity part is calculated. Here, the coordinates of the barycenter position is called a "marker coordinates". Also, the barycenter position can be calculated with more detailed scale than the resolution of the imager 50c. Now, the resolution of the imaged image imaged by the imager 50c shall be 126×96, and the barycenter position shall be calculated with the scale of 1024×768. That is, the marker coordinates is represented by the integer from (0, 0) to (1024, 768).

Additionally, the positions in the imaged image are represented in a coordinate system (X-Y coordinate system of the imaged image) by taking the upper left of the imaged image as an original point O, the downward direction as the Y-axis positive direction, and the right direction as the X-axis positive direction.

Furthermore, in a case that the object images are accurately detected, two high-intensity parts are determined as object images by the determination processing, and therefore, it is possible to calculate the two marker coordinates. The image processing circuit 50d outputs data indicative of the calculated two marker coordinates. The data (marker coordinate data) of the output marker coordinates is included in the input data by the processor 70 as described above, and transmitted to the game apparatus 12.

When detecting the marker coordinate data from the received controller data, the game apparatus 12 (CPU 60) can calculate instruction positions (instruction coordinates) of the first controller 34 on the screen of the monitor 26 and the distance from the first controller 34 to each of the markers 30a and 30b on the basis of the marker coordinate data. More specifically, from the midpoint position of the two marker coordinates, the position to which the controller 34 faces, that is, the instructed position is calculated. Furthermore, the distance between the object images in the imaged image is changed depending on the distance between the controller 34 and the markers 30a and 30b, and therefore, by calculating the distance between the two marker coordinates, the game apparatus 12 can grasp the distance between the controller 34 and the markers 330a and 30b.

Returning to FIG. 11, the data indicating the acceleration detected by the acceleration sensor 84 is also output to the communication unit 88. The acceleration sensor 84 has a sampling period being in the order of 200 frames/seconds at the maximum, for example.

The connector 42 is connected with the connector 106 of the gyro sensor unit. The gyro sensor unit 100 includes the microcomputer 102 and the gyro sensor 304 inside thereof. The gyro sensor 104 shows the above-described gyro sensors 104a and 104b, and has a sampling period similar to the acceleration sensor 84, for example. The microcomputer 102 outputs to the communication unit 88 data indicating the angular velocity detected by the gyro sensor 104 via the connector 106 and the connector 42.

The connector 108 of the gyro sensor unit 100 is connected with the connector 40 of the cable 38 extending from the second controller 36. The connector 40 is connected with an operating portion 54 and an acceleration sensor 86 of the second controller 36. The operating portion 54 shows the above-described stick 54a and operation buttons 54b, 54c. When the operating portion 54 is operated, data indicating the operation is applied to the microcomputer 102 of the gyro sensor unit 100 via the cable 38, the connector 40 and the connector 108. The microcomputer 102 outputs the data to the communication unit 88 via the connector 106 and the connector 42. The acceleration sensor 86 also has a sampling period similar to the acceleration sensor 84, and the data indicating the acceleration thus detected is also output to the communication unit 88 by the microcomputer 102.

Here, each output to the above-described communication unit 88 is executed at a cycle of 1/200 seconds. Accordingly, during arbitrary 1/200 seconds, operation data from the operating portion 46, position coordinate data from the imaged information arithmetic section 50, acceleration data from the acceleration sensor 84, angular velocity data from the gyro sensor 104, operation data from the operating portion 54, and acceleration data from the acceleration sensor 86 are output to the communication unit 88 once for each of them.

Figure 15:
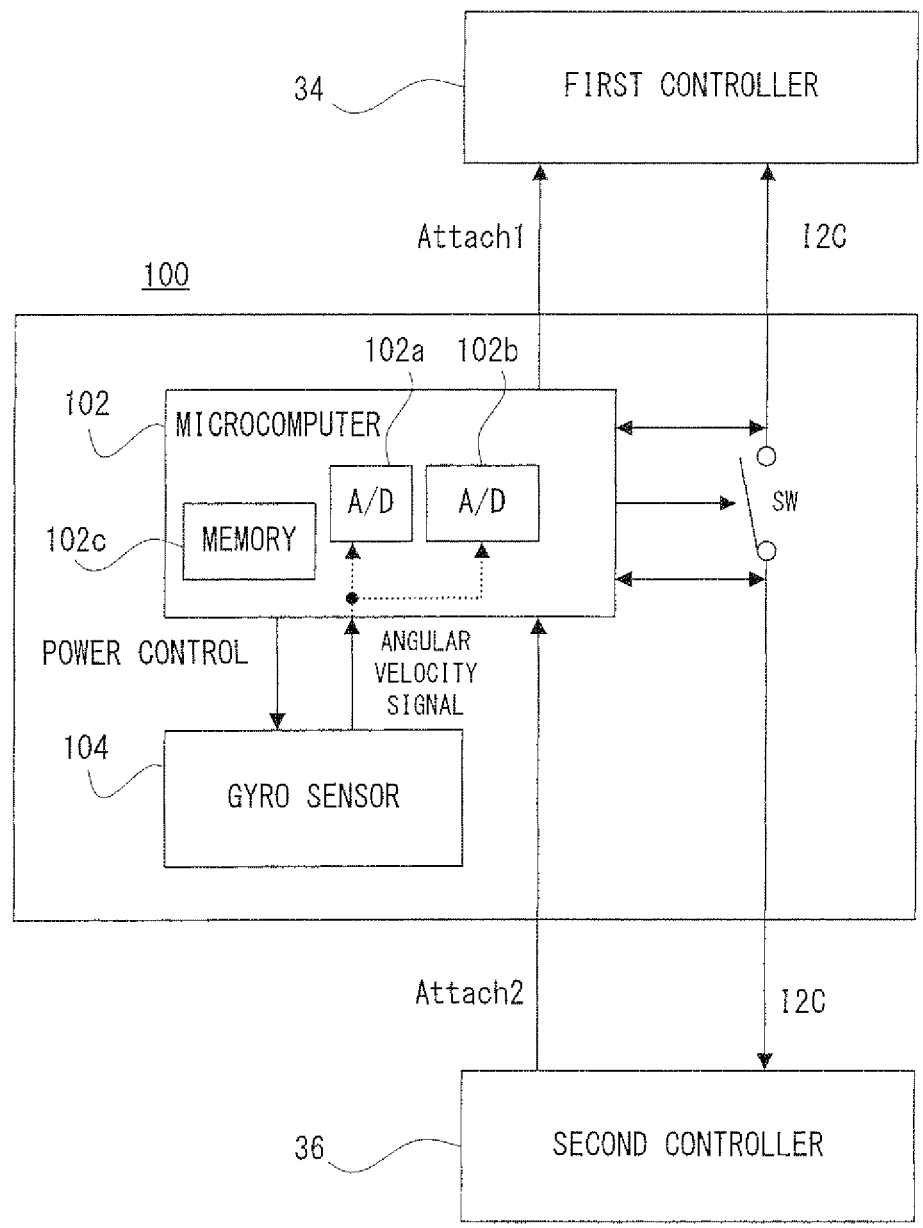
FIG. 15 is a block diagram showing an electric configuration of the gyro sensor unit between the first controller and the second controller in the controllers in FIG. 11.

FIG. 15 shows an important part of the gyro sensor unit 100 of the entire configuration shown in FIG. 11. Each of the above-described connector 42, connector 106, connector 108 and connector 40 is a connector of six pins, for example, in which an Attach pin for controlling a variable "Attach" indicating a connected state between the connectors is included. The Attach is changed between "Low" indicating that the connectors are disconnected, and "High" indicating that the connectors are connected. In what follows, the Attach between the connector 42 and the connector 106, that is, between the first controller 34 and the gyro sensor unit 100 is called "Attach1", and the Attach between the connector 108 and the connector 40, that is, the gyro sensor unit 100 and the second controller 36 is called "Attach2".

Even if the first controller 34 is attached with, the gyro sensor unit 100, if the application is a gyro-incompatible type, and the gyro sensor unit 100 is not connected with the second controller 36, the Attach1 is controlled to be "Low" such that the gyro sensor unit 100 is not viewed from the gyro-incompatible application by the microcomputer 102 of the gyro sensor unit 100 (standby mode: see FIG. 19). In the standby mode, a power supply to the gyro sensor 104 is stopped to make the gyro function inactive. The microcomputer 102 exclusively performs a mode selection based on the Attach2 and a power source management based on an instruction from the gyro-compatible application.

The other two pins out of the aforementioned six pins are assigned I2C buses, and the gyro sensor unit 100 further includes a bus switch SW for connecting/isolating the I2C bus on the side of the first controller 34 and the I2C bus on the side of the second controller 36. The bus switch. SW is turned on by the microcomputer 102 when the gyro-incompatible application is executed in a state that the second controller 36 is connected to the first controller 34 via the gyro sensor unit 100. Thereafter, the data from the second controller 36 is output to the communication unit 88 through the I2C bus without passing through the microcomputer 102 (bypass mode: see FIG. 19). Thus, the microcomputer 102 merely performs a mode selection and a power source management similar to the standby mode, which reduces electric power consumption. Furthermore, the gyro-incompatible application can be executed even with the gyro sensor unit 100 attached. When the bus switch SW is turned off, the bus is connected to the microcomputer 102, and the data to be output to the first controller 34 is controlled by the microcomputer 102.

The bus switch SW is turned on even in the standby mode. This makes it possible for the gyro-compatible type application to confirm whether or not the first controller 34 is attached with the gyro sensor unit 100 with reference to a special address of the I2C bus even if the Attach1 is controlled to "Low" as described above.

It should be noted that the gyro sensor unit 100 is prepared with four modes including a "gyro" mode and a "gyro & second controller" mode in addition to the above-described "standby" and "bypass" modes. In the former two modes, the bus switch SW is turned off.

The microcomputer 102 of the gyro sensor unit 100 includes two kinds of A/D conversion circuits 102a and 102b, and an angular velocity signal about the three axes output from the gyro sensor 104 is applied to each of the A/D conversion circuits 102a and 102b. In the A/D conversion circuit 102a, A/D converting processing of a high angular velocity mode for regarding all the detection range by the gyro sensor 104 (±360°/sec) as a target, for example, is executed, and in the A/D conversion circuit 102b, A/D converting processing of a low angular velocity mode for regarding a part of the detection range by the gyro sensor 104 (±90°/sec, for example) as a target is executed. The microcomputer 102 outputs any one of the two kinds of the results of the A/D transformation as angular velocity data.

More specifically, when two kinds of angular velocity data corresponding to at a certain time are output from the A/D conversion circuits 102a and 102b, the microcomputer 102 first determines whether or not with respect to the angular velocity data of the low angular velocity mode, the value A falls within the range of a first threshold value Th1 to a second threshold value Th2 (>Th1), that is, a condition "Th1≤A≤Th2" is satisfied, for each of the axis, that is, the yaw axis, the roll axis, and the pitch axis. Next, on the basis of these three determination results, any one of the low angular velocity mode and the high angular velocity mode is selected. For example, with respect to each of the three determination results, if "YES", the low angular velocity mode is selected for each axis, and if "NO", the high angular velocity mode is selected for each axis. Then, the angular velocity data according to the mode selected for each axis is output along with the mode information indicating the selected mode. That is, by changing accuracy of the data depending on the angular velocity, it is possible to output data with high accuracy at low speeds even if the data amount is equal.

FIG. 16 shows a data format handled by the gyro sensor unit 100. FIG. 16(A) shows a data format for gyro sensor unit 100, and FIG. 16(B) shows a data format for second, controller 36. The data for gyro sensor unit 100 includes yaw angular velocity data, roll angular velocity data and pitch angular velocity data, and yaw angular velocity mode information, roll angular velocity mode information and pitch angular velocity mode information, and second controller connection information and gyro/second controller identifying information.

Figure 17:
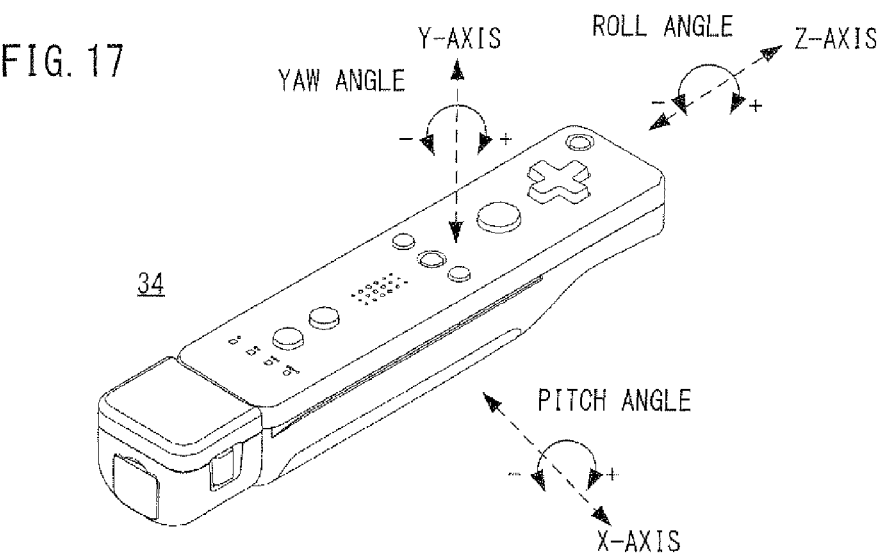
FIG. 17 is an illustrative view showing a yaw angle, a pitch angle, and a roll angle which, can be detected by the gyro sensor.

Here, as shown in FIG. 17, the rotation about the y-axis is represented by a yaw angle, the rotation about x-axis is represented by a pitch angle, and the rotation about z-axis is represented by a roll angle.

The yaw angular velocity data, the roll angular velocity data and the pitch angular velocity data, each of which is 14 bits data, for example, are respectively obtained, through an A/D conversion, from a yaw angular velocity signal, a roll angular velocity signal and a pitch angular velocity signal which, are output from the gyro sensor 104. Each of the yaw angular velocity mode information, the roll angular velocity mode information and the pitch angular velocity mode information is information of one bit indicating a corresponding mode of each of the angular velocity data, and changed between "0" corresponding to the high angular velocity mode and "1" corresponding to the low angular velocity mode.

The second controller connection information is information of one bit to indicate whether or not the second controller 36 is connected to the connector 108, and is changed between "0" indicating a non-connection and "1" indicating a connection. The gyro/second controller identifying information is information of one bit to identify whether the data is data output from the gyro sensor unit 100 or the data output from the second controller 36, and is changed between "1" indicating that this is from the gyro sensor unit 100 and "0" indicating that this is from the second controller 36.

On the other hand, the data for second controller 36 includes X stick operation data and Z stick operation data respectively indicating a stick operation in the right and left direction (X-axis direction) and a stick operation in the forward and reward direction (Z-axis direction), and X acceleration data, Y acceleration data and Z acceleration data respectively indicating an acceleration in the X-axis direction, an acceleration in the Y-axis direction and an acceleration in the Z-axis direction, and button operation data, second controller connection information, and gyro/second controller identifying information.

The gyro sensor unit 100 alternately outputs data for gyro according to the format shown in FIG. 16(A) and data for second controller according to the format shown in FIG. 16(B) to the communication unit 88 at a cycle of 1/200 seconds, for example. Accordingly, the data in the one of the format is consequently output at a cycle of 1/100 seconds, but this is much shorter than the cycle of 1/60 seconds as a general processing period for game processing, etc., and therefore, even if the data is alternately output, both of the data can be used for one frame at the same time in the game processing.

The communication unit 88 includes a microcomputer (micon) 90, a memory 92, a wireless module 94, and an antenna

96. The micon 90 transmits the obtained data to the game apparatus 12 and receives data from the game apparatus 12 by controlling the wireless module 94 while using the memory 92 as a memory area (working area and buffer area) in processing.

The data output to the communication unit 88 from the gyro sensor unit 100 is temporarily stored in the memory 92 through the microcomputer 90. The data output to the communication unit 88 from the operating portion 46, the imaged information arithmetic section 50 and the acceleration sensor 84 within the first controller 34 are also temporarily stored in the memory 92. The microcomputer 90 outputs data stored in the memory 92 to the wireless module 94 as controller data when a transmission timing to the game apparatus 12 has come. The controller data includes the data for first controller in addition to the data for gyro and/or the data for second, controller shown in FIG. 16(A) and FIG. 16(B). The data for first controller includes X acceleration data, Y acceleration data and Z acceleration data based on an output from the acceleration sensor 84, position coordinate data based on an output from the imaged information arithmetic section 50, and button operation data (key data) based on an output from the operating portion or the input means 46.

The wireless module 94 modulates a carrier at a predetermined frequency by the controller data, and emits its weak radio wave signal from the antenna 96 by using a short-range wireless communication technique, such as Bluetooth (trademarks). Namely, the controller data is modulated to the weak radio wave signal by the wireless module 96 and transmitted from the first controller 34. The weak radio wave signal is received by the wireless controller module 72 of the game apparatus 12. The weak radio wave thus received is subjected to demodulating and decoding processing, so that the game apparatus 12 can obtain the controller data. The CPU 60 of the game apparatus 12 performs the game processing on the basis of the controller data obtained from the controller 14. Here, the wireless communication between the first controller 34 and the game apparatus 12 may be executed according to another standard, such as a wireless LAN, etc.

Figure 18:
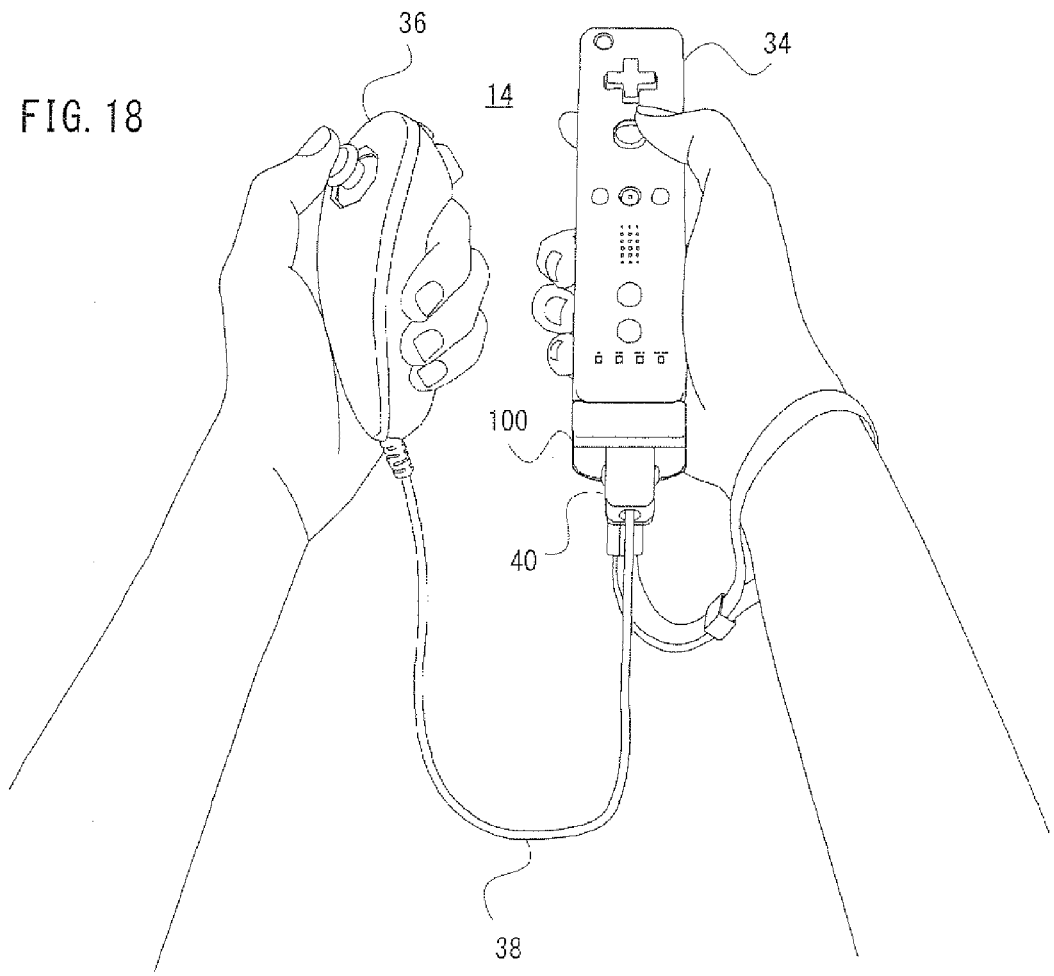
FIG. 18 is an illustrative view showing one example of a state that a game player holds the first controller and the second controller when he or she actually plays the game.

In this game system 10, a user can make an input to an application like a game, or the like by moving the controller 14 itself other than a button operation. In playing the game, for example, the user holds the first controller 34 (specifically, holding portion 44a of the housing 44: FIG. 2) with the right hand and the second controller 36 with the left hand as shown in FIG. 18. As described above, the first controller 34 is incorporated with the acceleration sensor 84 for detecting accelerations in the three-axis directions, and the second controller 36 is also incorporated with the similar acceleration sensor 86. When the first controller 34 and the second controller 36 are moved by the player, acceleration values in the three-axis directions indicating the motions of the respective controllers are detected by the acceleration sensor 84 and the acceleration sensor 86. In a case that the gyro sensor unit 100 is attached to the first controller 34, angular velocity values about the three-axes indicating the motion of the first controller 34 itself is further detected.

These detected values are transmitted to the game apparatus 12 in a form of the aforementioned controller data. In the game apparatus 12 (FIG. 10), the controller data from the controller 14 is received by the input-output processor 62a via the antenna 72a and the wireless controller module 72, and the received controller data is written to the buffer area of the internal main memory 62e or the external main memory 66. The CPU 60 reads the controller data stored in the buffer area of the internal main memory 62e or the external main memory 66, and restores the detected value, that is, the values of the acceleration and/or the angular velocity detected by the controller 14 from the controller data.

Here, the angular velocity data has two modes of the high angular velocity mode and the low angular velocity mode, and therefore, the two kinds of angular velocity restoring algorithms corresponding to the two modes are prepared. In restoring the angular velocity value from the angular velocity data, the angular velocity restoring algorithm corresponding to the mode of the angular velocity data is selected on the basis of the angular velocity mode information.

The CPU 60 may execute processing for calculating a velocity of the controller 14 from the restored acceleration in parallel with such a restoring processing. In parallel therewith, a travel distance or a position of the controller 14 can be evaluated from the calculated velocity. On the other hand, from the restored angular velocity, a rotation angle of the controller 14 is evaluated. Here, the initial value (constant of integration) when the accelerations are accumulated to calculate the velocity, and the angular velocities are accumulated to calculate the rotation angle can be calculated from the position coordinate data from the imaged information arithmetic section 50, for example. The position coordinate data can also be used for correcting the errors accumulated due to the integration.

The game processing is executed on the basis of the variables, such as the acceleration, the velocity, the travel distance, the angular velocity, the rotation angle which are thus evaluated, etc. Accordingly, all of the processing described above need not to be executed, and the variables necessary for the game processing may be calculated as required. It should be noted that the angular velocity and the rotation angle can also be calculated from the acceleration in principle, but this requires a complex routine for the game program, which, also imposes a heavy processing load on the CPU 60. By utilizing the gyro sensor unit 100, a development of the program is made easy, and the processing load on the CPU 60 is reduced.

By the way, some games may be a game for single controller of utilizing only the first controller 34 and other games may be a game for two controllers of utilizing the first controller 34 and the second controller 36, and the respective games are classified into any one of the gyro-compatible type and the gyro-incompatible type. The first controller 34 being a main controller can be used for playing all the games. Furthermore, the second controller 36 being an expanding controller is connected to the first controller 34 via the gyro sensor unit 100 or directly when the game for two controllers is played, and is removed in general when the game for single controller is played.

On the other hand, the gyro sensor unit 100 being an expanding sensor or an expanding controller is not required when the gyro-incompatible game is played, but it is not required to take the trouble to be removed. Thus, the gyro sensor unit 100 remains to be attached to the first controller 34, and dealt as a single unit with the first controller 34, in general. The second controller 36 is detachable similar to a case that the gyro sensor unit 100 is not attached except that the connection destination of the connector 40 is changed from the connector 42 to the connector 108.

FIG. 19 shows a table in which a control by the microcomputer 102 of the gyro sensor unit 100 is described for each mode. The mode prepared for the gyro sensor unit 100 is four kinds of the aforementioned "standby", "bypass", "gyro" and "gyro and second controller", and the target to be controlled by the microcomputer 102 covers six items of "gyro function", "gyro power source", "bus switch", "expanding connector", "Attach1" and "I2C address".

The gyro function is in a stopped state (No Active) in each of the standby mode and the bypass mode, but is in a started-up state (Active) in each of the gyro mode and the gyro and second controller mode. A power supply to the gyro power source, that is, the gyro sensor 104 is stopped (OFF) in each of the standby mode and the bypass mode, and executed (ON) in each of the gyro mode and the gyro and second controller mode. The bus switch SW is connected (Connect) in each of the standby mode and the bypass mode, and isolated (Disconnect) in each of the gyro mode and the gyro and second controller mode.

The expanding connector, that is, the connector 108 is in a started-up state in each of the bypass mode and the gyro and second controller mode, and in a stopped state in each of the standby mode and the gyro mode. The Attach1 is controlled to "Low" indicating an unconnected state in the standby mode, and to "High" indicating a connected state in each of the bypass mode, the gyro mode and the gyro and second controller mode. In relation to the I2C address, a special address is noted only in each of the standby mode and the bypass mode.

The mode switching is performed shown in a manner in FIG. 20. FIG. 20(A) shows switching processing in a case that the application is gyro-compatible, and FIG. 20(B) shows switching processing in a case that the application is gyro-incompatible. In common to FIG. 20(A) and FIG. 20(B), that is, irrespective of whether the gyro-compatible application or the gyro-incompatible application, the gyro sensor unit 100 starts up in response to the gyro sensor unit 100 itself being connected to the first controller 34, and enters in a standby mode being an initial mode. Here, when the second controller 36 is connected to the gyro sensor unit 100, the standby mode shifts to the bypass mode, and when the second controller 36 is then removed therefrom, the bypass mode is restored to the standby mode.

Here, the gyro-compatible application issues a call and a reset to the gyro sensor unit 100 in order to fetch angular velocity data as required. As described above, in this embodiment, it is possible to control the controller from the game machine by the communication, and therefore, by the application, it is possible to control the gyro sensor unit 100. Thus, as shown in FIG. 19(A), when receiving a call from the application in the standby mode, the gyro sensor unit 100 shifts to the gyro mode, and when receiving a reset from the application in the gyro mode, the gyro sensor unit 100 is restored to the standby mode. Furthermore, the gyro sensor unit 100 shifts to the gyro and second, controller mode when being connected with the second controller 36 in the gyro mode, and is restored to the gyro mode when being disconnected with the second controller 36 in the gyro and second controller mode. The gyro sensor unit 100 further shifts to the bypass mode when receiving a reset from the application in the gyro and second controller mode, and is restored to the gyro and second controller mode when receiving a call from the application in the bypass mode.

On the other hand, the gyro-incompatible application does not have a function of performing a call and a reset with respect to the gyro sensor unit 100. Thus, when the gyro-incompatible application is executed, the mode of the gyro sensor unit 100 is merely switched between the standby mode and the bypass mode as shown in FIG. 20(B). The mode switching of the gyro sensor unit 100 is implemented by such a microcomputer 102 referring to the table shown in FIG. 19, but the detailed description thereof is omitted.

Figure 21:
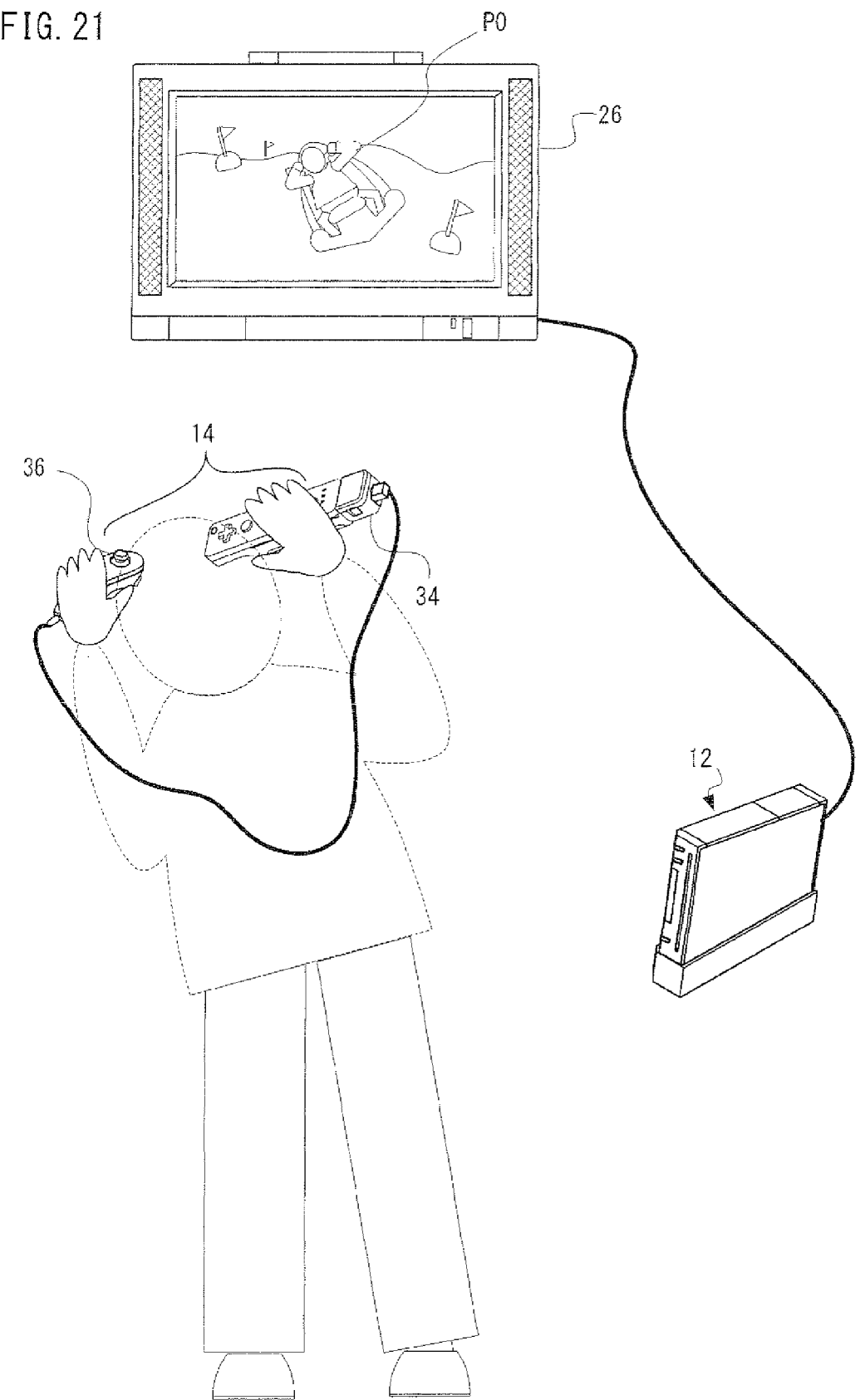
FIG. 21 is an illustrative view showing a manner in which a player plays a personal watercraft game in the first embodiment.

One example of a virtual game utilizing the game system 10 is described with reference to the drawings. Explanation is made on the outline of the game. FIG. 21 is an illustrative view showing a manner in which a player plays the game as a first embodiment. The first embodiment is a game in which the player operates a personal watercraft within the game screen by moving the first controller 34 and the second controller 36. As shown in FIG. 21, the player holds the first controller 34 and the second controller 36 in face-to-face relationships as if the both controllers are one handle. Then, after the personal watercraft game is started, the two controllers, which are aligned side by side, are tilted like a handle of an actual personal watercraft. Similar to the actual personal watercraft, when the two controllers are tilted toward a roll direction from the player, the body of the watercraft is leaned, and the moving direction can be turned from side to side. In a case that the player tilts both of the controllers to the left as shown in FIG. 21, a personal watercraft (and a player object being in one body with the personal, watercraft) PO within the game space turns to the left while leaning its orientation as shown in FIG. 22(a). Furthermore, if the player tilts both of the controllers in the pitch direction, the orientation of the body can be leaned back and forth. For example, in a case that the player tilts both of the controllers upward, the personal watercraft PO takes an orientation such that the front part of the body is floated up within the game space as shown in FIG. 22(b). Here, FIG. 22(b) shows the personal watercraft PO within the game space from a side, and the actual game screen is a screen viewing the personal watercraft PO from behind as shown in FIG. 22(a).

Furthermore, assuming that the B button 46h is an accelerator button, while the B button 46h is pressed, the personal watercraft PO can go ahead, for example. Accordingly, it is possible to perform an accelerating operation in a manner the same as an accelerator provided to the handle of an actual personal watercraft.

However, with respect to the handle of a general motorbike, although not a personal watercraft, acceleration is made by twisting the handle grasped with the right hand in the pitch direction, and in the game of this embodiment also, the acceleration can be made by a twist of the right hand. More specifically, if the first controller 34 is rotated about the z-axis, the personal watercraft PO within the game is accelerated. That is, by twisting the right hand as does by the accelerator of the real motorbike, it is possible to produce acceleration. In this embodiment, the accelerator operation takes an operation by the above-described B button 46h as a base, and allows a temporary acceleration over the upper limit to the velocity of the button operation by adding a twist.

That is, it is possible for the player to perform an intuitive handle operation and an accelerator operation close to the actual personal watercraft. It is also possible to accelerate the personal watercraft PO with an operation close to an accelerator operation of the real motorbike. The player can control the velocity with the button without continuously twisting the controller for acceleration, and can speed up over the normal running by adding a twist at a timing when the player wants to accelerate, capable of making a load on the player less than when the player constantly twists the handle. Accordingly, in a case that a more real operation is given priority in another embodiment, such as a general motorbike game, etc. except for the personal watercraft, the strength of the accelerator may be decided only from the attitude of the first controller 34.

In addition, in the present embodiment, when the first controller 34 is rotated about a yaw direction of the player (about the y-axis of the first controller, or about the x-axis direction depending on circumstances), it is possible to make a performance such that the personal watercraft PO is spun horizontally as shown in FIG. 22(c). At a time of this operation, the first controller 34 may be rotated at hand, or the player himself may be rotated horizontally with the two controllers in his or her hands.

FIG. 23 and FIG. 24 show the above-described operations based on the attitudes of the controllers in detail. In FIG. 23, M1 and M2 are attitudes of the first controller 34 and the second controller 36, respectively. The attitude is represented by a three-dimensional rotation matrix, for example, and represents the attitudes obtained by making which rotation is made from a reference state. The state as a reference is a state in which the first controller 34 and the second controller 36 set face to face with each other so as to become horizontal, for example, as shown in FIG. 23(a). Each of the axis directions of both of the acceleration sensors is shown by x1, y1, z1, in relation to the first controller 34, and x2, y2, z2 in relation to the second controller 36. However, in the reference state in FIG. 23(a), the first controller 34 and the second controller 36 set face to face with each other such that the respective axial directions are not coincident. The calculation of the rotation is a rotation represented not by the coordinate system of the acceleration sensors but by the coordinate system defined within the space (xyz shown in FIG. 23(a)). As an example of setting the coordinate system in this embodiment, the x-direction of the coordinate system is the right direction when viewed from the player, that is, the z2 direction in the reference state, the y direction is the upper direction of the player, that is, the y1 and y2 directions as a reference state, and the z direction is the front direction when viewed from the player, that is, the x1 direction as a reference state.

The attitudes M1 and M2 are decided on the basis of the accelerations. That is, by regarding the accelerations obtained from the first controller 34 and the second controller 36 as gravitational accelerations g1 and g2, respectively, and assuming that the direction of gravitational force is the direction vertically below, the attitudes M1 and M2 of the controller are calculated. That is, the acceleration data g1 and g2 are obtained as vectors in the three-dimensional coordinate system of the respective acceleration sensors, and if the acceleration data g1 and g2 are directed to the direction vertically below or the negative direction of the y-axis, directions to which the respective axes of the sensors are directed in the space coordinate system are relatively defined, and by calculating which rotation of the attitude is made from the reference state, the attitudes M1, M2 are also calculated. As shown in FIG. 23(b), in a case that an acceleration applied to the first controller 34 is changed to g1', the directions of x1, y1, z1 when the vector direction of the g1' is directed to the negative direction of the y-axis in the space coordinate system are x1', y1', z1', and therefore, the rotation M1' can be calculated. After completion of calculating the attitudes M1 and M2, an average attitude Mm obtained by averaging the attitudes M1 and M2 is calculated. The average attitude Mm is utilized for controlling the personal watercraft PO in the game. The use of the average attitude Mm for control allows a natural input even if another operation is made in parallel with one controller as well as reduction of an effect from unintentionally input, etc. In addition, in the handles of the motorbikes, some right and left handles are not in a straight line, but may form a predetermined angle or may be approximately in parallel with each other. However, even if the player holds the two controllers in such states, the average attitude becomes the attitude the same as a case that the handles are held in a straight line, and therefore, it is possible to reduce an effect due to variation in holding manners by the player.

FIG. 23 shows the change of the direction of the specific vectors defined for the sake of convenience through the three-dimensional rotation, and shows the changes of rotations of the respective controllers and the rotation of the average. Here, an average vector of the two vectors (y1, y2 directions here) directed to the upper direction of the controllers in the above-described reference state is regarded as a vector ave with respect to the attitudes of the first controller 34 and the second controller 36, and with reference to the ave, the average attitude Mm is explained. In FIG. 23(a) being the reference state, the average vector ave is the upper direction, that is, the positive direction of the y-axis. Then, by the change of the attitudes of the respective controllers, the upward vectors of the controllers become y1', y2', respectively, in FIG. 23(b), and the average vector becomes ave' in FIG. 23(b). In FIG. 23(b), the tilts of the first controller 34 and the second controller 36 are different, but the tilt of the average vector ave' is the average between the tilts. Then, the orientation of the personal watercraft PO is decided in correspondence to the attitude of this average vector. The vector is not actually required to be calculated, and a rotation Mm' itself which changes the ave to the ave' may be calculated. The orientation of the personal watercraft PO is obtained by adding the rotation Mm' to the attitude in the reference state, and leaned to the right as shown in FIG. 23(c). The orientation of the personal watercraft PO is obtained by not merely rotating the attitude in the reference state, but may be decided in advance in correspondence to the value of the Mm. This makes it possible to set a pose of the player object on the personal watercraft PO in detail in correspondence to the lean.

Next, with reference to FIG. 24, an operation on the basis of an angular velocity of the first controller 34 is explained. First, an accelerating operation of the personal watercraft PO by adding a twist to the first controller 34 is explained. FIG. 24(a) and FIG. 24(b) respectively show the reference state, and a state of the controllers after operation and the average rotation similar to FIG. 23, and are illustrative views when viewed from a side, that is, viewed along the x-direction defined in the space in FIG. 23. FIG. 24(a) shows the reference state as in FIG. 23(a). Then, FIG. 24(b) shows a state in which a twisting operation of the first controller 34 toward the player is added. That is, this is a state in which an accelerating operation of the personal watercraft PO is performed regarding the first controller 34 as an accelerator of a motorbike. At this time, an angular velocity Rz about the z-axis of the first controller 34 (rotation in the pitch direction since the first controller 34 is horizontally held in this embodiment) is detected by the gyro sensor 104. With respect to the attitudes of the controllers, the first controller 34 is largely tilted, but the second controller 36 is not tilted, so that the average rotation Mm' results in a rotation with a less tilt. That is, in a case that both of the first controller 34 and the second controller 36 are tilted in order to lean the orientation of the personal watercraft PO, the personal watercraft PO is leaned by the tilt, but in a case that only the first controller 34 is twisted for acceleration, the lean of the personal watercraft PO is restricted, capable of preventing the personal watercraft PO from being leaned unnaturally. The personal watercraft PO is leaned such that it slightly floats as shown in FIG. 24(c) and accordingly accelerated within the game space on the basis of the input of the angular velocity Rz. That is, since the watercraft PO is floated when accelerated, it is possible to eliminate an uncomfortable feeling as a motion of the personal watercraft too. Thus, if the rotation of the first controller 34 is also used for the rotation accelerating operation, the effect of the attitude is reduced, and since the watercraft PO is floated when accelerated, it is possible to realize an orientation control of the object by the attitude of the controller and an acceleration of the object by rotating the controller, simultaneously and without uncomfortable feeling.

Furthermore, a case that a yaw direction when viewed from the player, that is, the angular velocity about the y-axis of the first controller 34 is detected besides the angular velocity Rz about the z-axis of the first controller 34 is explained. When a rotation to the yaw direction is added to the first controller 34 as described above, the personal watercraft PO makes a performance, such as horizontally spinning in the air. That is, in a case that the angular velocity Ry is detected in the direction about the y-axis of the first controller 34, the personal watercraft PO is horizontally rotated as shown in FIG. 24(d). Since the rotation in the yaw direction dose not reflect on calculation of the orientation by accelerations, the player can input this performance independent of the orientation control. Here, an input for instructing a horizontal spinning is not restricted to the angular velocity about the y-axis, and may be based on the angular velocity about the x-axis. That is, the input of the horizontal spinning is only necessary to be a rotation in the yaw direction when viewed from the player. This is because such a rotation becomes the rotation about x-axis when the first controller 34 is tilted. With respect to the angular velocity about the y-axis and the angular velocity about the x-axis of the first controller 34, any one of them may be a condition by bring it into correspondence to the attitude of the first controller 34, or both of them may constantly be a condition.

Figure 25:
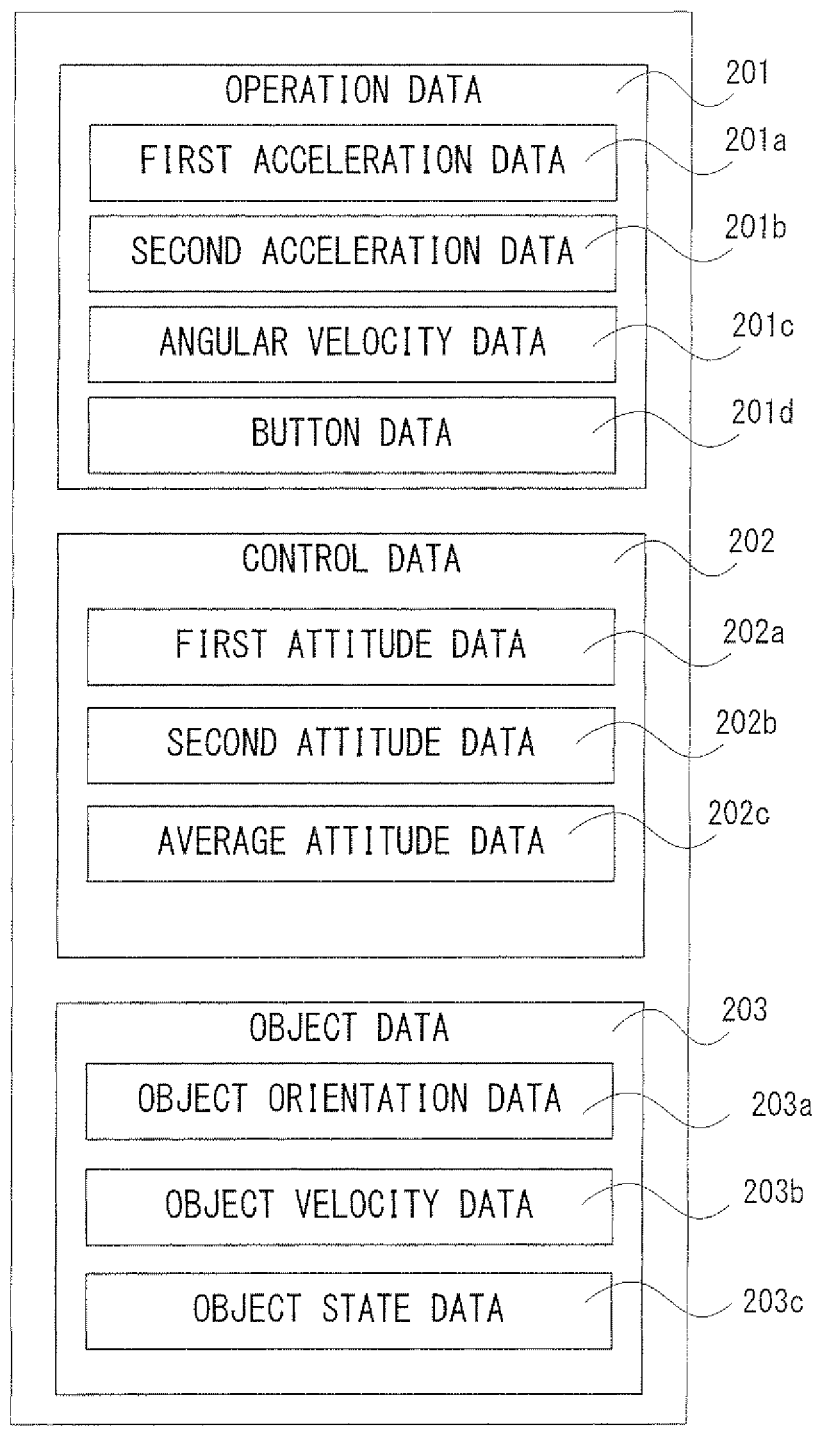
FIG. 25 is a view showing a memory map of data to be used, in the game of this embodiment.

Next, the flowchart of the program of this embodiment is explained in detail with reference to FIG. 25-FIG. 27. FIG. 25 shows a memory map of the data to be used in execution of the program of this embodiment. These data are stored in the internal main memory 62e and an external main memory 66 of the game apparatus 12. Furthermore, the internal main memory 62e and the external main memory 66 also store programs, but the illustration is omitted.

Operation data 201 is operation data to be transmitted from the controller 14. In this operation data, first acceleration data 201a indicating three-axis accelerations of the first controller 34 based on an output from the acceleration sensor 84, second acceleration data 201b indicating three-axis accelerations of the second controller 36 based on an output from the acceleration sensor 86, angular velocity data 201c indicating three-axis angular velocities of the first controller 34 based on an output from the gyro sensor 104, and button data 201d based on a button operation, etc are included.

Control data 202, which is calculated on the basis of the operation data 201, is data for controlling a game. The control data 202 includes first attitude data 202a, second attitude data 202b, average attitude data 202c, etc. The first attitude data 202a is an attitude of the first controller 34 calculated on the basis of the first acceleration data 201a, and corresponds to the M1 in FIG. 23 and FIG. 24. The second attitude data 202b is an attitude of the second controller 36 to be calculated on the basis of the second acceleration data 201b, and corresponds to the M2 in FIG. 23 and FIG. 24. The average attitude data 202c is an average attitude between the first attitude data 202a and the second attitude data 202b, and corresponds to the Mm in FIG. 23 and FIG. 24. Each of the attitude data is represented by a three-dimensional rotation matrix in this embodiment, but may be represented by data in other formats if only the attitude is specified.

The object data 203 is data of an object within the game, and includes at least object orientation data 203a indicating an orientation of a player object (personal watercraft PO in this embodiment) within the game space, object velocity data 203b indicating a velocity and a moving direction of the player object within the game space, and object state data 203c indicating a state of the player object, data on whether or not the watercraft PO is spinning, for example. Here, beside these, the object data also includes model data indicating the shape of objects, texture image data, etc. and also includes data in relation to the objects except for the player object, but illustration is omitted here. Furthermore, besides these, data of audio and image which are necessary for the game are stored as required, but these are omitted here.

Figure 26:
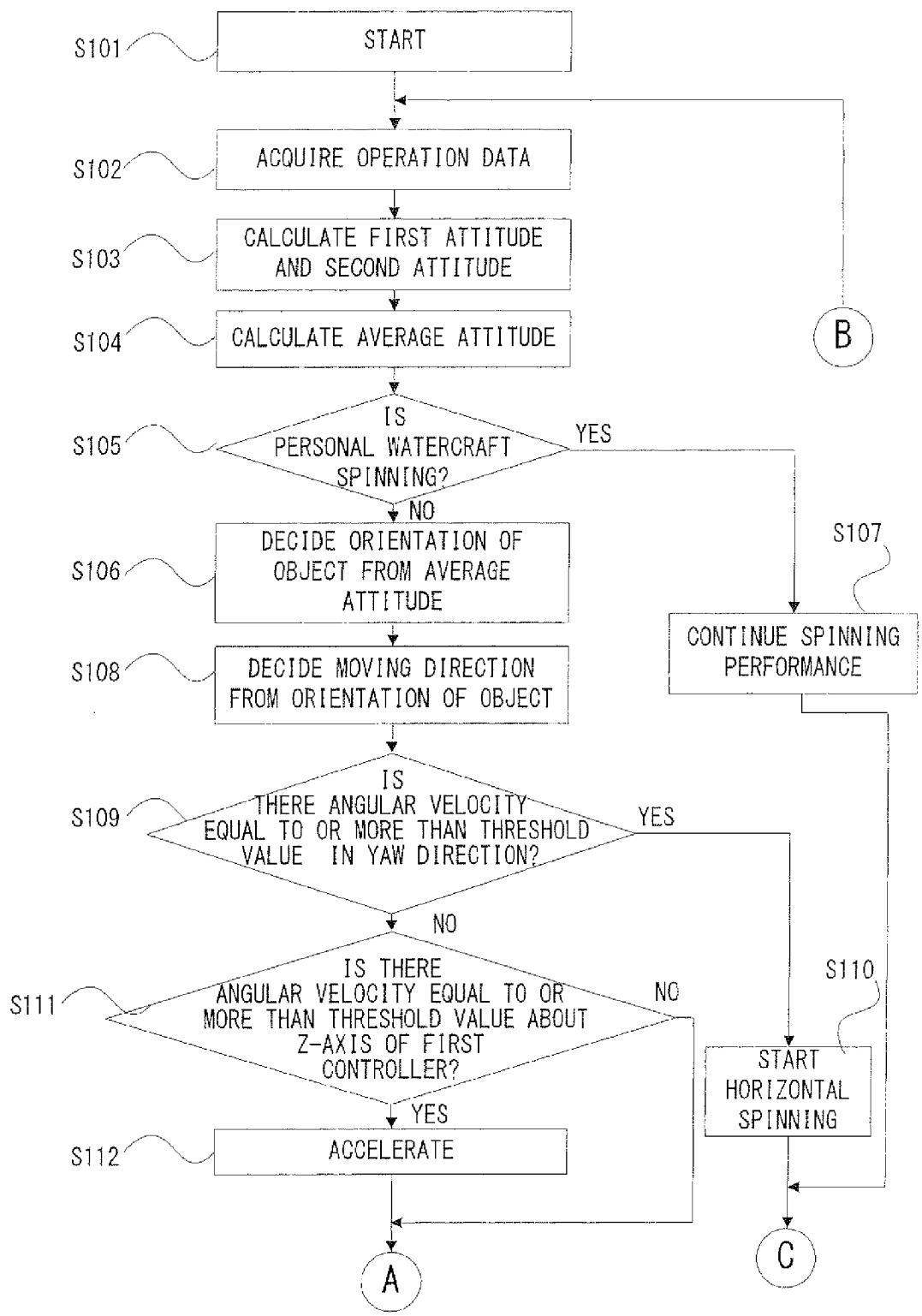
FIG. 26 is a flowchart showing game processing of this embodiment.
Figure 27:
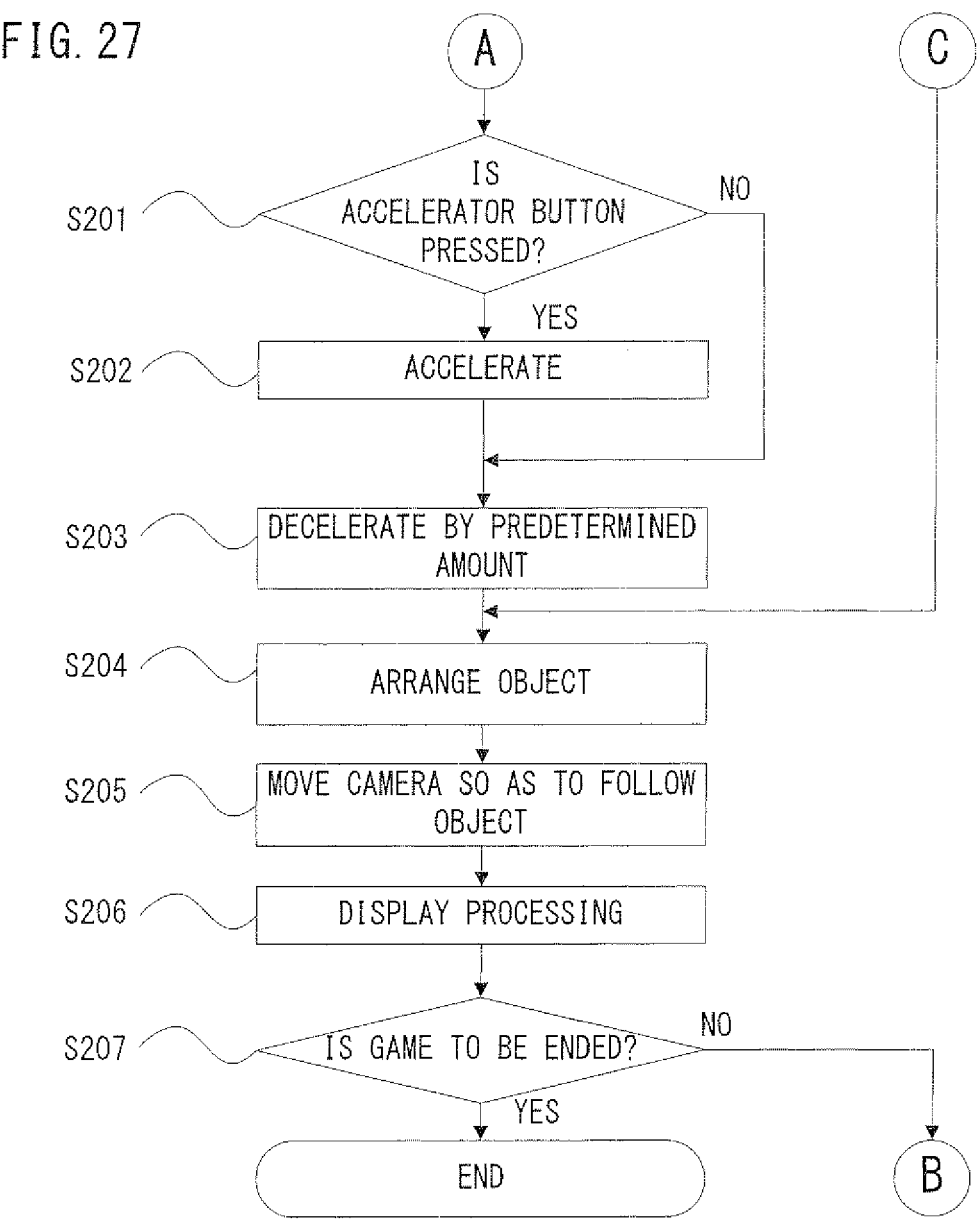
FIG. 27 is a flowchart showing game processing of this embodiment.

Each of FIG. 26 and FIG. 27 is a flowchart explaining a flow of the processing of the game program of the personal watercraft in this embodiment. The game program is executed by the CPU 60, etc. of the game apparatus 12.

First, in a step S101, game starting processing is executed to perform predetermined initialization processing.

Next, in a step S102, acquisition of operation data is performed by reading operation data 201 transmitted from the controller 14 and stored in the memory as required.

Next, in a step S103, attitudes of the first controller 34 and the second controller 36 are respectively calculated on the basis of the first acceleration data 201a and the second acceleration data 201b from the acquired operation data 201. These attitudes are calculated as a three-dimensional rotation matrix according to the aforementioned manner, and stored as first attitude data 202a and second attitude data 202b, respectively.

Next, in a step S104, a rotation matrix being the average between the first attitude data 202a and the second attitude data 202b is calculated and stored as average attitude data 202c.

Then, in a step S105, it is determined whether or not the personal watercraft PO is spinning. For determination, the object state data 203c is referred, and if it is spinning, the process proceeds to a step S107, and if the determination result is negative, the process proceeds to a step S106. That is, for the above-described horizontal spinning performance, several frames of animation is used, and during this time, the personal watercraft PO performs a preset motion, so that the control of the orientation and velocity is not performed.

In the step S107, processing of spinning performance is performed. More specifically, in order to reproduce a spinning motion, the orientation and the position of the personal watercraft PO are set, and the object orientation data 203a and the object velocity data 203b are updated. Here, when the last frame of the spinning motion has come, the object state data 203c is rewritten with data indicating that the personal watercraft PO is not spinning.

If the determination result is negative in the step S105, processing for running is performed. Thus, in the step S106, the orientation of the personal watercraft PO is first decided from the average attitude data 202c. That is, the personal watercraft is rotated by the rotation indicated by the average attitude data 202c from the reference state, and the result of the rotation is stored as object orientation data 203a. Alternatively, the orientation being associated with the value of the average attitude data 202c in advance is read and set to the object orientation data 203a.

Next, in a step S108, the moving direction of the personal watercraft PO is decided in correspondence to the orientation of the personal watercraft PO. That is, when the orientation is leaned to the right or left with respect to the direction of travel, the object velocity data 203b is updated such that the personal watercraft PO is further turned to the leaned direction depending on the degree of the lean. In the object velocity data 203b, the moving direction and the moving velocity (moving amount of one frame) of the personal watercraft PO are set. In a case that the moving direction and the moving velocity are represented by a three-dimensional vector, for example, a unit vector indicating the set direction is stored in the step S108, and the length of the vector, that is, the velocity is decided in the processing described later.

Next, in a step 109, with reference to the angular velocity data 201c, it is determined whether or not the first controller 34 makes a predetermined rotation in a yaw direction from the player. More specifically, it is determined whether or not the value of the angular velocity about the y-axis and/or the x-axis is equal to or more than a predetermined threshold value.

If the determination result is affirmative in the step S109, since a horizontally spinning performance is instructed, spin starting processing is executed, in a step S110. More specifically, the object state data 203c is updated to the data indicating that the watercraft PO is spinning, and the orientation and the position of the personal watercraft PO are set such that they represent the first frame of the horizontally spinning motion.

If the determination result is negative in the step S109, horizontally spinning is not performed, and therefore, in a next step S111, with reference to the angular velocity data 201c, it is determined whether or not there is an angular velocity about the x axis of the first controller 34 equal to or more than a threshold value. This is for determining whether or not the first controller 34 is twisted by the player to perform an acceleration instruction.

If the determination result in the step S111 is affirmative, the velocity of the personal watercraft PO is accelerated by a predetermined amount in a step S112, the length of the vector of the object velocity data is updated, and then, the process proceeds to a step S201. If the determination result in the step S111, is negative, the process proceeds to the step S201 without going through the step S112.

In the step S201, it is determined whether or not the accelerator button is pressed on the basis of the button data 201d. The accelerator button is the B button 46h, for example, and if the button is pressed, the determination is affirmative, and if the button is not pressed, the determination is negative.

In a case that the determination result is affirmative in the step S201, the velocity of the personal watercraft PO is increased by a predetermined amount in a step S202, and the process proceeds to the step S111. If the determination result is negative in the step S109, the process directly proceeds to the step S111. Here, with respect to the acceleration of the personal watercraft PO in the steps S112 and S202, if the increased velocity is set to be larger in the acceleration in the step S112, the accelerator by twisting the first controller 34 can be used as a dash instruction useable only when acceleration is especially made.

In a step S203, by decreasing the length of the vector of the object velocity data 203c by a predetermined ratio, processing of decreasing the velocity of the personal watercraft PO by a predetermine ratio from the current velocity is performed. The decrease of the velocity is for representing a resistance of water or air in the reality, and the higher the velocity is, the larger the velocity to be decreased is. Thus, if the accelerator button is continuously pressed, at a time when the velocity is high to a certain extent, the accelerated amount and the decelerated amount are equal to each other to maintain a constant velocity. Furthermore, in a case that a further acceleration is made by twisting the first controller 34 in a state that the accelerator button is continuously pressed, the velocity is temporarily accelerated and then gradually decreased to a constant velocity. If an operation for acceleration is not performed, the personal watercraft PO is naturally decelerated to be stopped.

By the processing from the above-described steps S111 to S203, the moving direction and the moving velocity (moving amount per unit of time) of the personal watercraft PO are calculated, and these are stored as a three-dimensional vector in the object velocity data 203b.

Next, in a step S204, the personal watercraft PO is arranged at an orientation indicated by the object orientation data 203a and a position moved by the object velocity data 203b within the game space.

Next, in a step S205, the virtual camera is moved so as to follow the personal watercraft POs such that the personal watercraft PO is constantly displayed on the screen, Besides, with respect to the objects other than the personal watercraft PO, updating the positions and orientations are appropriately performed for the game, and in a step S206, displaying processing is performed. In the step S206, the processing of producing a two-dimensional screen on the basis of the position of the virtual camera and the arrangement of the polygon model, and displaying the same on the screen is performed, but this processing may preferably be performed by the GPU 62b in place of the CPU 60.

In a step S207, it is determined whether or not a game is to be ended on the basis of a predetermined condition, such as making a mistake in the game or clearing the game. If the game is to be ended, the game processing is ended. If the game is not to be ended, the process returns to the step S102. Accordingly, the game processing in this embodiment is executed for each frame of period for displaying the game screen.

According to the above-described game processing, it is possible to execute a game of moving the personal watercraft PO within the game space by moving the first controller 34 and the second controller 36. By the attitude of the controller, the orientation and the moving direction, of the personal watercraft PO are controlled, and on the basis of the angular velocity from the gyro sensor, the personal watercraft PO can be accelerated or horizontally spun. This makes it possible to perform an intuitive operation as if the player actually operates the personal watercraft. Furthermore, on the basis of the attitude being the average between the respective controllers, the orientation and the moving direction of the personal watercraft PO can be controlled, so that it is possible to control an unnatural motion of the personal watercraft PO due to an abrupt input, and satisfy both of the direction control by the attitude and the acceleration control by the twist.

This embodiment is the game of the personal watercraft, and allows waves to occur within the game space, and therefore, the personal watercraft PO may be jumped depending on the size of the waves to be ridden by the personal watercraft PO. Then, the orientation control in the pitch direction and performance of horizontally spinning of the personal watercraft may be made only during the jumping.

This embodiment is an example of the personal watercraft, but it is needless to say that this can be applied to games which make an operation of general motorbikes according to a similar way of operation. In addition, this can be applied to games operating various objects besides the above description.

Additionally, in this embodiment, the gyro sensor unit 100 is attached to only the first controller 34, but the gyro sensor may also be provided to the second controller 36. If the two gyro sensors are used, a further complex operation is made possible. Furthermore, the gyro sensor 104 may be constructed to be included in the first controller 34 and the second controller 36.

Another embodiment of the present invention is explained below. It should be noted that in the memory map of the first embodiment shown in FIG. 25 for explanation, the control data 202 and the object data 203 are different from one game to another, but the operation data 201 is common, and therefore, the operation data 201 is referred in the following explanation as necessary.

FIG. 28 is a second embodiment of the present invention. FIG. 28(a) is an example of an action game in which a player object PO battles with a sword in its hand. In the game of this embodiment, by moving the first controller 34, a sword object POR is operated while by moving the second controller 36, a shield object POL is operated, First, a control of the shield is explained. For example, when an acceleration is detected in the negative direction of the z-axis of the second controller 36 on the basis of the second acceleration data 201b, that is, when the player vertically holds the second controller 36, the player object PO heightens the shield, and when an acceleration is detected in directions other than the above description, that is, when the player does not vertically hold the second controller 36, the shield is not heightened.

Next, a control of the sword is explained. With reference to the first acceleration data 201a, if an acceleration equal to or more than a predetermined magnitude is detected, the player object PO swings a sword. Furthermore, depending on the direction in which the acceleration is detected, the direction in which the first controller 34 is swung is specified, and then, the player object PO performs an action of cutting an enemy with the sword toward the corresponding direction. For example, if an acceleration in the y-axis direction of the first controller 34 is detected, vertical cutting is performed, and if an acceleration in the x-axis direction thereof is detected, horizontal cutting is performed. Furthermore, depending on the magnitude of the detected acceleration, the strength of the cutting may be changed.

Here, in a case that the player rotates the first controller 34, it is possible to cause the player object PO to make another action. In a case that the player rotates the first controller 34 in the yaw direction, or in a case that the player himself or herself turns with the first controller 34 in his or her hand, in the angular velocity data 201c, an angular velocity about the y-axis of the first controller 34 is detected. In a case that the magnitude of the angular velocity is equal to or more than a predetermined threshold value, the player character performs rotating cutting. The rotating cutting is a powerful attack which clears up enemies in its neighbor in accordance with the player object PO horizontally rotating and cutting the enemies at the same time. Accordingly, a rotating action of the character in correspondence to the rotating input is performed, capable of implementing an intuitive input. Only from the analysis of the acceleration, it is difficult to discriminate a swing in the horizontal direction and a rotation in the yaw direction, but in this embodiment, since a rotation is determined on the basis of the angular velocity data 201c, it is possible to implement the game in which a control by an acceleration and an operation by a rotation are made possible. Furthermore, the angular velocity data 201c can show which direction the first controller 34 is directed (in relation to the yaw direction, for example) as well as a series of actions like a rotating cutting, and therefore, if the orientation of the character and the direction in which the character cuts are decided on the basis of the angular velocity data 201c, if is possible to perform a more intuitive action game. That is, this is an operation of accepting an input of the rotation of any one of the controllers by the angular velocity while operating the two objects by the accelerations of the two controllers.

In this embodiment, in a case that the first controller 34 and the second controller 36 are further faced upward, the player object PO may lift an item object POLR (bomb, for example) over the head, storing the sword and the shield. The determination whether the controller is faced upward may be a condition that the gravitational accelerations are detected in the negative directions of the z-axis of the respective controllers. It should be noted that in order to prevent an erroneous detection as the operations of the shield and the sword, an item may be lifted according to the fact that the condition of detecting the gravitational acceleration in the z-axis negative direction, is satisfied. Then, if the two controllers are banged down after the item is lifted, the player object PO throws the item. For example, the player object PO attacks the enemy in the ground by throwing the bomb, and so forth. The determination whether or not the controllers are banged down can be performed by the accelerations. Then, by moving the controller in the yaw direction while the item is lifted and then thrown, it is possible to control the direction in which the player object PO throws the item. The control of the direction is performed by the angular velocity. More specifically, in a case that the angular velocity about the z-axis of the first controller 34 is detected in the angular velocity data 201c in a state that the item is lifted, the player object PO is rotated in correspondence to the angular velocity. It is difficult to specify the rotation in the yaw direction from an acceleration, but in this embodiment, the rotation in the yaw direction is detected on the basis of the angular velocity to thereby control a direction in which the item is thrown, and therefore, it is possible to precisely control the direction in which the controller is thrown with an intuitive operation as if the player actually throws the item. That is, with respect to this operation, both of the accelerations of the two controllers are used for controlling one kind of motion, and by the angular velocity of the gyro sensor provided to any one of the controllers, the total direction of the two controllers is specified, and the game processing is performed corresponding to this direction. Accordingly, the gyro sensor may be provided to the second controller 36, or may be provided to both of the controllers.

As another example of an action game utilizing a sword, a shield may not be used. For example, the second acceleration data 201b may be used for an escape in place of the shield. That is, in a case that the second controller 36 is swung, an escaping action is performed by the player object. This escape may be an urgent escape accompanying an undefeatable time. Since the shield is not used, an item which is held, with both hands may be represented as a weapon to be operated by the first controller 34. A game in which a vertical swing, a horizontal swing, and a rotating swing are performed by the hammer held with both hands and an urgent escape is made with a swing of the second controller 36 is made possible. Furthermore, this makes it possible to implement a sword battle in which the player swings a sword, making an escape by moving his or her body with the second controller 36 in the player's breast pocket. On the contrary thereto, the first controller 34 may be put into the breast pocket to allow a precise escape action according to the angular velocity, and the second controller 36 may be swung to perform a cut action.

Figure 29:
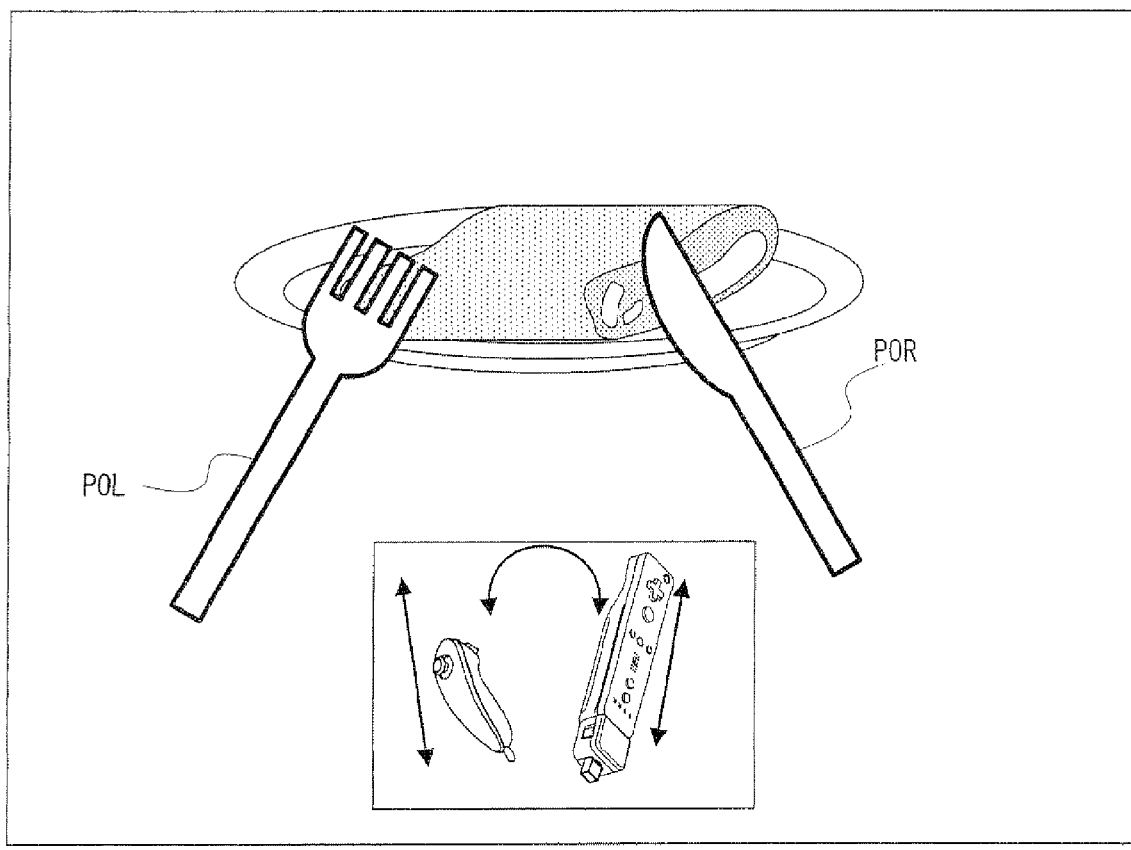
FIG. 29 is an illustrative view explaining a third embodiment.

FIG. 29 shows a third embodiment of the present invention. The third embodiment is an example of a game in which by moving a knife and a fork within the game space in accordance with motions of the first controller 34 and the second controller 36, a piece of meat is cut and eaten. A player holds the first controller 34 and the second controller 36, decides the position where to cut a piece of meat by changing the direction from side to side, and performs a motion of digging a fork object POL into the piece of meat and a motion of cutting the piece of meat with a knife object POR by moving the controllers back and forth. If these motions are successful, the player can eat the piece of meat.

More specifically, after the knife POR and the fork POL are set within the game space, an angular velocity in the yaw direction, that is, about the y-axis, here is detected on the basis of the angular velocity data 201c, and the knife POR or both of the knife POR and the fork POL are moved from right to left in the game space according to the angular velocity. With this control, with reference to the second angular velocity data 201b, it is determined whether or not there is a motion of moving the second controller 36 back and forth. More specifically, it is determined whether or not there are variations in the acceleration in the z axis. If the variations in the acceleration are detected, a digging the fork POL into the piece of meat is performed on the basis of the position of the fork POL within the game at that time. After the fork is dug, it is determined whether or not there is a motion of moving the first controller 36 back and forth with reference to the first angular velocity data 201a. More specifically, it is determined whether or not there are variations in the acceleration in the z-axis direction. If the variations in the acceleration are detected, a motion of cutting the piece of meat is made on the basis of the position of the knife POR within the game.

In this embodiment, the adjustment of positions from side to side by the angular velocity may be performed on only the knife POR, and the knife POR may operate at the same time as the fork POL. Furthermore, assuming that the first controller 34 and the second controller 36 are held with the hands different from usual, the fork POL is operated with the first controller, and the position of the fork POL may be controlled from side to side. Furthermore, other than the rotation in the yaw direction, on the basis of the rotation in the pitch direction or the roll direction, it is possible to cause the knife POR and the fork POL to take various orientations. In addition, this can be applied to a cooking game in which a cooking is performed by controlling the hands pressing a knife and ingredients in addition to the eating game with a knife and a fork.

Additionally, besides the cooking game, a haircut game, etc. can be implemented by a similar operation. That is, a comb can be operated with the movement of the second controller 36, and a pair of scissors can be operated with the movement of the first controller 34. With respect to the control of the comb, an orientation is calculated from the acceleration to thereby perform an operation of putting up a comb and laying down it, and with respect to the operation of the pair of scissors, an angular velocity is used to decide the position. If the hair-cutting instruction is made in response to the A button 46d and the B button 46h being simultaneously pressed, an intuitive operation close to an action of actually using a pair of scissors can be made.

Figure 30:
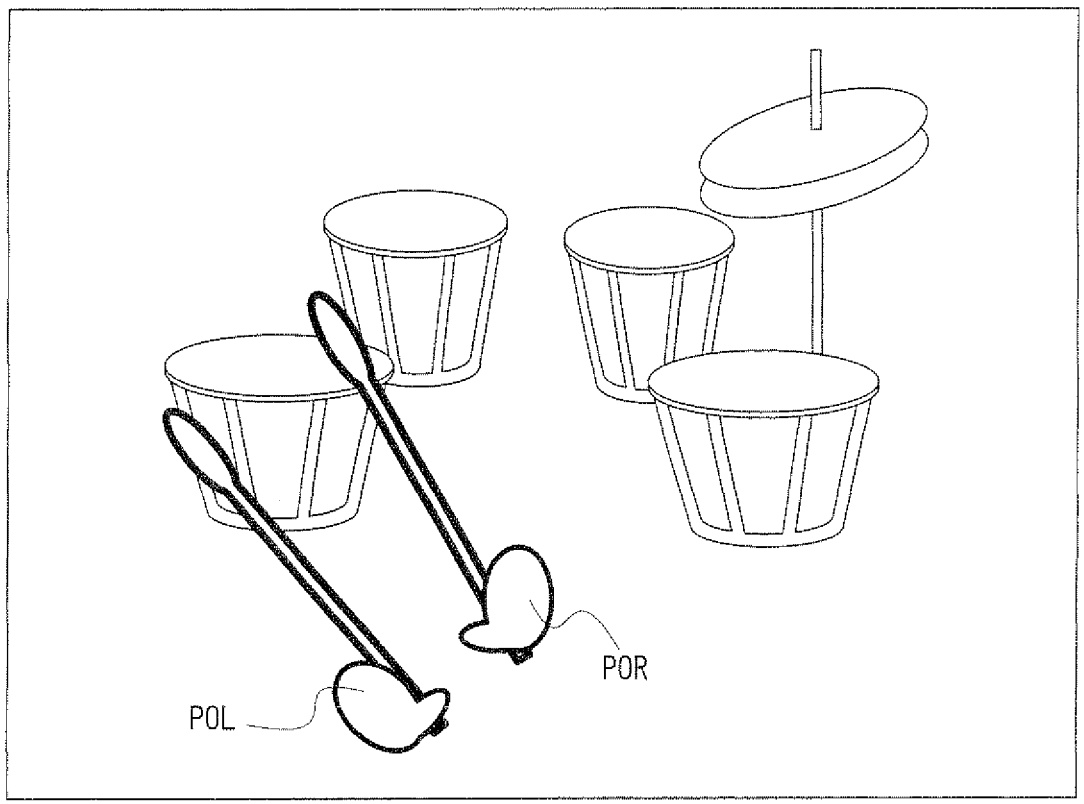
FIG. 30 is an illustrative view explaining a fourth embodiment.

FIG. 30 is an illustrative view explaining a fourth embodiment. The fourth embodiment is a music game. In the embodiment in FIG. 30, in a drum playing game, a right drum stick object POR is operated, with the first controller 34 and a left drum stick object POL is operated with the second controller 36. That is, a beating operation of a drum with a stick within the game is performed at a timing when an acceleration is added to each of the controllers. More specifically, with reference to the first acceleration data 201a and the second acceleration data 201b, the magnitude of a three-dimensional acceleration vector is calculated, and if the magnitude is equal to or more than a predetermined threshold value, it is determined that the controller is swung. Then, in a case that the magnitude of the first acceleration data 201a is equal, to or more than the threshold value, a drum beating motion is performed by the right drum stick object POR, and in a case that the magnitude of the second acceleration data 201b is equal to or more than the threshold value, a drum beating motion is performed by the left drum stick object POL. The drum beating operation is performed once for each swing.

The drum beating operation is performed on the basis of the acceleration data, and a control as to which drum is to be beaten is performed on the basis of the angular velocity data. That is, with reference to the angular velocity data 201c, a rotation of the player in the yaw direction (about the y-axis of the controller, here) is detected, and in response to the rotation, the positions of the right drum stick object POR and the left drum stick object POL within the game are changed to thereby raise the sticks on other drums. In a case that an input of beating the drum is performed as described above, a drum arranged near the position where the stick is raised at that time is beaten. That is, the player can beat the drum, within the game by an operation close to a real drum beating operation. At the same time, by a motion like actually changing its direction for selecting a drum to be beaten, it is possible to select a drum to be beaten within the game.

This embodiment is a game in which the motions of the two objects are controlled by the accelerations of the respective controllers, and the total direction or position of the two objects is controlled by the angular velocity. Here, a drum selection according to the angular velocity may be performed only by the right stick POR, and the object to be beaten by the left stick POL may be fixed, for example. Furthermore, by attaching a gyro sensor to the second controller 36 too, a drum selection and a drum beating operation may be made by the respective controllers, independently.

Furthermore, a music performance based on an angular velocity and two kinds of accelerations may be applied to the music game besides the drum. For example, this can be applied to a violin playing game, etc. although not shown. More specifically, an input of playing a violin can be made such that the violin is operated with an acceleration of the first controller 34 and a bow is operated with an acceleration of the second controller 36, and a performance of changing the orientation of the violin can be made according to the angular velocity of the first controller 36. In addition, this can be applied to a game in which a player plays a conductor. That is, by two accelerations, a motion of swinging a taktstock and the hands of the conductor is controlled, and by an angular velocity, the direction of the conductor, that is, to which player the conductor swings the taktstock.

FIG. 31 is an illustrative view showing examples of sports games of a fifth embodiment. FIG. 31(a) is a swimming game, FIG. 31(b) is a judo game, and FIG. 31(c) is a boxing game.

In the swimming game in FIG. 31(a), a motion of a right arm POR of a player object is controlled on the basis of the first acceleration data 201a, and a motion of a left arm POL of the player is controlled on the basis of the second acceleration data 201b. More specifically, when an acceleration equal to or more than a predetermined magnitude is detected, a player object PO throws its arms to go ahead in the water. Then, on the basis of the angular velocity data 201c, a swimming direction is controlled. For example, in correspondence to the rotation of the player in the yaw direction or the roll direction (an appropriate direction may be selected according to a camera angle, etc. of the game), the direction in which the player object PO swims is turned. In addition, in correspondence to the rotation in the pitch direction, the moving direction from the direction in which the player object dives and to the direction in which the player object is floated up (a breathing action may be further accompanied) may be controlled. Accordingly, in the embodiment of FIG. 31(a), the moving direction of the object is controlled by the angular velocity, and the moving velocity of the object is controlled by the acceleration.

In the judo game in FIG. 31(b), an opponent character is displayed, and only hands of a player object are displayed. Then, the motion of a right hand object POR is controlled on the basis of the first acceleration data 201a, and the motion of a left hand object POL is controlled on the basis of the second acceleration data 201b. More specifically, by tilts, the position can be controlled, and a pushing (then holding) motion can be performed. Then, on the basis of the angular velocity data 201c, a twist is added to the right hand object POR. That is, a motion of simultaneously pushing and twisting can be performed, capable of throwing the opponent. This operation method is a game for throwing the opponent by pushing and twisting, and therefore, this can be applied to a sumo game, for example, without being restricted to the judo game. In this embodiment, when the two objects are controlled by the accelerations, a twist can be added to the motion of the one object by the angular velocity.

As another example of such a game, a boxing game in. FIG. 31(c) can be performed. In this embodiment, on the basis of the accelerations, a player object PO can land a punch with a right hand object POR when the first controller 34 is swung, and land a punch with a left hand object 36POL when the second controller 36 is swung. Then, when the player does not land a punch, similar to the first embodiment, the orientation of the player object PO can be controlled by the average orientation between the two controllers to thereby ward off and defend himself from the punch by an opponent. When punches are landed, it is determined whether or not a rotation is added to the swinging of the controller with reference to the angular velocity data 201c. If the rotation is added, it is possible to land a punch of a kind corresponding to the rotation. That is, it is possible to reflect a motion on the game, such as landing an uppercut by twisting the wrist in response to the rotation in the pitch direction, and landing a hook by rotating the elbow in response to the rotation in the yaw direction. If a gyro sensor is provided to the second controller 36 too, with respect to the punch with the left hand POL, a punch in addition to a twist is made possible.

Additionally, this can be applied to a game which reproduces catch of the baseball as another embodiment although not shown. More specifically, the attitude of the second controller 36 is specified from the second acceleration data 201b to thereby control the position of a glove, and the first controller 34 is swung to thereby throw a ball. Then, when a ball is thrown by swinging the first controller 34, by detecting a rotation with reference to the angular velocity data 201c, a twist is added to the throwing to thereby cause the player object to throw a screwball, Furthermore, the present invention can also be applied to a horse riding game not shown. That is, a jockey object is a player object. A swing of the second controller 36 is detected by the second acceleration data 201b, and a motion of swinging a quirt is performed to control a speed of a horse. The moving direction of the horse can be controlled by swinging reins with the first acceleration data 201a, and pulling the reins with the angular velocity data, etc.

The present invention is for performing game processing on the basis of the first acceleration data, the second acceleration data, and the angular velocity data. There are two methods of utilizing accelerations in which one object is controlled by two accelerations and two objects are controlled by two accelerations. Then, by further performing a control with an angular velocity, the direction of the controller is specified, so that it is possible to realize a game in which the total direction, position, etc. of the object to be controlled is adjusted. Also, it is possible to implement a game in which a motion which is hard to detect by an acceleration can be used by means of an angular velocity as a condition for causing the object to be controlled to make a special action. Additionally, it is possible to implement a game in which an effect of a rotation is given to a motion of an object to be controlled by an acceleration. Thus, by performing game processing on the basis of the first acceleration data, the second acceleration data, and the angular velocity data, various utilizing methods can effectively be applied depending on the purpose of the game without being restricted to the above description.

Additionally, in this embodiment, the gyro sensor unit 100 is attached to only the first controller 34, but a gyro sensor may also be provided to the second controller 36 too. If the two gyro sensors are used, a further complex operation is made possible. Furthermore, the gyro sensor 104 may be constructed to be included in the first controller 34 and the second controller 36.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium readable by a computer of a game apparatus, the storage medium storing a game program which, when executed by the computer, causes the computer to perform operations comprising:
    acquire operation data from first and second independent movable input devices used by the same game player to play a game corresponding to the game program, the first input device including at least a first acceleration sensor and an angular velocity sensor, and the second input device including at least a second acceleration sensor; and
    perform game processing on the basis of at least first acceleration data in response to an output from the first acceleration sensor, second acceleration data in response to an output from the second acceleration sensor, and angular velocity data in response to an output from the angular velocity sensor,
    wherein the game processing comprises respectively controlling movement of first and second different parts of the same unitary player object based on a corresponding one of the first and second acceleration data, and controlling a direction of the player object in a virtual world based on the angular velocity data.

2. A game apparatus, comprising:
    an input interface configured to acquire operation data from first and second independently movable input devices used by the same game player to play a game, the first input device including at least a first acceleration sensor and an angular velocity sensor, and the second input device including at least a second acceleration sensor; and
    a processor configured to perform game processing on the basis of at least first acceleration data in response to an output from the first acceleration sensor, second acceleration data in response to an output from the second acceleration sensor, and angular velocity data in response to an output from the angular velocity sensor,
    wherein the game processing comprises respectively controlling first and second different parts of the same unitary player object based on a corresponding one of the first and second acceleration data, and controlling a movement direction of the player object in a virtual world based on the angular velocity data.

3. A method for using a first input device and a second input device, which are independently movable and associated with the same user by a processing device, to provide inputs to a process running on the processing device, the first input device including at least a first acceleration sensor and an angular velocity sensor and the second input device including at least a second acceleration sensor, the method comprising:
acquiring first acceleration data from the first acceleration sensor, second acceleration data from the second acceleration sensor and angular velocity data from the angular velocity sensor; and
respectively controlling first and second different parts of the same unitary player object on a display based on a corresponding one of the first and second acceleration data, and controlling a movement direction of the player object based on the angular velocity data.

4. A system comprising:
a first input device including at least a first acceleration sensor and an angular velocity sensor;
a second input device independently movable with respect to the first input device and including at least a second acceleration sensor;
a processing system which associates the first and second input devices with the same user and which is configured to control a player object on a display based on at least first acceleration data from the first acceleration sensor, second acceleration data from the second acceleration sensor, and angular velocity data from the angular velocity sensor,
wherein the processing system controls movement of a first arm of the player object based on the first acceleration data, controls movement of a second arm of the player object based on the second acceleration data, and controls direction of movement of the player object in a virtual world based on the angular velocity data.

5. The system according to claim 4, wherein the first and second input devices are coupled together.

6. The system according to claim 5, wherein the first and second input devices are coupled together by a wired connection.

7. The system according to claim 4, wherein the first and second input devices have different shapes.

8. A system comprising:
a first input device including a first acceleration sensor and an angular velocity sensor;
a second input device independently movable with respect to the first input device and including a second acceleration sensor;
a processing system configured to control a unitary player object displayed on a display based on at least first acceleration data from the first acceleration sensor, second acceleration data from the second acceleration sensor, and angular velocity data from the angular velocity sensor,
wherein the processing system respectively uses the first acceleration data, the second acceleration data and the angular velocity data in controlling different aspects of the same displayed player object.

9. The system according to claim 8, wherein the first and second input devices are coupled together.

10. The system according to claim 8, wherein the first and second input devices are coupled together by a wired connection.

11. The system according to claim 8, wherein the first and second input devices have different shapes.

12. The system according to claim 8, wherein the different aspects comprise one or more aspects of movement of the object.

* * * * *